(12) United States Patent
Niiho et al.

(10) Patent No.: US 7,212,747 B2
(45) Date of Patent: May 1, 2007

(54) OPTICAL TRANSMISSION DEVICE AND OPTICAL TRANSMISSION METHOD FOR TRANSMITTING A BURST RADIO SIGNAL

(75) Inventors: Tsutomu Niiho, Katano (JP); Hiroyuki Sasai, Katano (JP); Kouichi Masuda, Hirakata (JP); Kenji Miyanaga, Mino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 623 days.

(21) Appl. No.: 10/456,910

(22) Filed: Jun. 9, 2003

(65) Prior Publication Data

US 2003/0228151 A1    Dec. 11, 2003

(30) Foreign Application Priority Data

Jun. 10, 2002   (JP) .............................. 2002-168755
Jun. 10, 2002   (JP) .............................. 2002-169077

(51) Int. Cl.
   *H04B 10/04*   (2006.01)
   *H04B 10/12*   (2006.01)
   *H04B 10/00*   (2006.01)
   *H04B 10/16*   (2006.01)

(52) U.S. Cl. ...................... 398/186; 398/189; 398/192; 398/193; 398/115; 398/140; 398/116; 398/178; 398/41; 398/42

(58) Field of Classification Search ................ 398/115, 398/140, 116, 178, 41, 42, 186
   See application file for complete search history.

(56) References Cited

U.S. PATENT DOCUMENTS

| 5,488,621 A | | 1/1996 | Slawson et al. |
| 5,631,757 A | * | 5/1997 | Bodeep et al. ............... 398/138 |
| 5,689,355 A | * | 11/1997 | Okubo et al. ................ 398/116 |
| 5,724,170 A | * | 3/1998 | Aizawa ....................... 398/197 |

FOREIGN PATENT DOCUMENTS

| EP | 0 538 635 | | 4/1993 |
| EP | 0 662 740 | | 7/1995 |
| EP | 0 878 882 | | 11/1998 |
| JP | 5-136724 | | 6/1993 |
| JP | 09331095 A | * | 12/1997 |
| JP | 2002-16506 | | 1/2002 |

* cited by examiner

*Primary Examiner*—Jason Chan
*Assistant Examiner*—Danny Wai Lun Leung
(74) *Attorney, Agent, or Firm*—Wenderoth, Lind & Ponack, L.L.P.

(57) ABSTRACT

A light emitting section outputs an optical signal having an intensity corresponding to a transmission timing signal, the optical signal modulated based on a radio transmission signal. A received photocurrent detection section detects an intensity of an optical signal received by a light receiving section. In accordance with the detected intensity, a high frequency amplification section amplifies the output signal of the light receiving section, and a transmission timing signal reconstruction section reconstructs the transmission timing signal.

35 Claims, 19 Drawing Sheets

TIME

OPTICAL TRANSMISSION DEVICE AND OPTICAL TRANSMISSION METHOD FOR TRANSMITTING A BURST RADIO SIGNAL

BACKGROUND OF THE INVENTION

1. Field of the Invention

The present invention relates to an optical transmission device transmitting and receiving a radio band signal in a burst manner by an optical fiber, and a radio communication system using the above-described optical transmission device.

2. Description of the Background Art

Conventionally, a radio optical fiber (Radio On Fiber: hereinafter, referred to as ROF) technique utilizing a wide bandwidth advantage of an optical fiber for transmitting a radio band signal by the optical fiber is known. Japanese Patent Laid-Open Publication No. H05-136724, for example, discloses the ROF technique. The above-described ROF technique is used, for example, in communications between a center station and an antenna side base station in a mobile communication system. FIG. 27 is a block diagram showing the structure of the mobile communication system using the ROF technique. The system shown in FIG. 27 includes a center station 1, antenna side base stations 2, optical fibers 3, and mobile phones 4, and allows the mobile phone 4 to perform bi-directional communications with another mobile phone 4 in the system.

Radio communications are performed between the antenna side base station 2 and the mobile phone 4. The optical fiber 3 interconnects the center station 1 and the antenna side base station 2, and optical communications are performed therebetween. The center station 1 is connected to other center stations (not shown). In order to allow the mobile phone 4 to perform bi-directional communications with another mobile phone 4 in the system, the center station 1 receives a signal transmitted from the mobile phone 4, and transmits the received signal to the antenna side base station 2 or other center stations.

When transmitting a signal to the mobile phone 4, the center station 1 converts a transmission signal into a radio signal. Then, the center station 1 converts the obtained radio signal into an optical signal, and sends the obtained optical signal to the optical fiber 3. The antenna side base station 2 converts the optical signal transmitted over the optical fiber 3 into an electric signal, and transmits an electric wave based on the obtained electric signal. The electric wave transmitted from the antenna side base station 2 is received by the mobile phone 4. On the other hand, an electric wave transmitted from the mobile phone 4 is received by the antenna side base station 2. The antenna side base station 2 obtains a radio band reception signal based on the received electric wave, converts the obtained reception signal into an optical signal, and sends the obtained optical signal to the optical fiber 3. The center station 1 reconstructs the radio band reception signal by converting the optical signal transmitted over the optical fiber 3 into an electric signal, and obtains a reception signal by demodulating the reconstructed radio band reception signal.

FIG. 28 is a block diagram showing the structure of a conventional optical transmission device and a conventional radio communication system. Note that, in the radio communication system, FIG. 28 shows only a downlink system from a center station 100 to an antenna side base station 200. In FIG. 28, a radio transmission signal 182 is a transmission signal to be transmitted to the mobile phone 4, the transmission signal being converted into a radio signal. A transmission timing signal 181 is a signal indicating whether the radio communication system is in a transmission state or in a non-transmission state, that is, indicating whether or not the radio transmission signal 182 is generated. As shown in FIG. 29, the transmission timing signal 181 is frequency multiplexed with the radio transmission signal 182, and transmitted from the center station 100 to the antenna side base station 200.

A modulation section 101 modulates the transmission timing signal 181 using these methods such as ASK (Amplitude Shift Keying) or PSK (Phase Shift Keying). A multiplexing section 102 frequency multiplexes the signal output from the modulation section 101 with the radio transmission signal 182. A light emitting section 104 obtains a supply of a fixed bias current from a bias circuit 103, and sends an optical signal, whose intensity is modulated based on the signal output from the multiplexing section 102, to a downlink optical fiber 3a.

A light receiving section 201 converts the optical signal, which is output from the light emitting section 104 and transmitted over the downlink optical fiber 3a, into an electric signal. A demultiplexing section 202 including a low pass filter (LPF) 251 and a band pass filter (BPF) 252 demultiplexes the electric signal output from the light receiving section 201 so as to obtain the two original signals, that is, the signal output from the modulation section 101 and the radio transmission signal 182, which have been multiplexed by the multiplexing section 102. A high frequency amplification section 204 amplifies one signal demultiplexed by the demultiplexing section 202 by a fixed amplification factor, and supplies the amplified signal to an antenna switch 205. A demodulation section 203 demodulates the other signal demultiplexed by the demultiplexing section 202, and outputs a transmission timing signal 281 varying in a manner similar to the transmission timing signal 181.

The antenna switch 205 changes the function of an antenna 206 in accordance with the transmission timing signal 281. In accordance with the transmission timing signal 281, the antenna 206 either transmits an electric wave based on the signal amplified by the high frequency amplification section 204, or receives an electric wave. When the antenna 206 receives an electric wave, the antenna switch 205 outputs the radio band reception signal received by the antenna 206 to a terminal 207. An uplink system (not shown) from the antenna side base station 200 to the center station 100 is connected to the terminal 207. The signal output from the terminal 207 is transmitted from the antenna side base station 200 to the center station 100 by the above-described uplink system.

In the case where communications between the center station and the antenna side base station are performed using the ROF technique as described above, a radio signal modulation/demodulation function is provided to the center station, not to the antenna side base station. Thus, the use of the ROF technique allows small and low cost antenna side base stations to be realized.

In the radio communication system typified by the mobile communication system, TDMA (Time Division Multiple Access), for example, maybe used in order to accommodate a plurality of terminals in a single network. Also, TDD (Time Division Duplex), for example, maybe used in order to perform multiplexed transmission of uplink and downlink signals using a single transmission path. In the radio communication system using TDMA or TDD, data is transmitted based on time division transmission technique, whereby a radio signal is transmitted in a burst manner.

Also, a permissible deviation is defined in the antenna side base station with respect to power of an electric wave emitted from the antenna. Therefore, the antenna side base station has to be provided with an automatic power control circuit (hereinafter, referred to as APC circuit) stabilizing the power of the electric wave emitted from the antenna. Thus, the antenna side base station included in the mobile communication system using TDMA or TDD has to be provided with the APC circuit for a radio signal transmitted in a burst manner (hereinafter, referred to as a burst radio signal).

As the APC circuit for the burst radio signal, an APC circuit (FIG. 30) disclosed in Japanese Patent Laid-Open Publication No. 2002-16506 is known. In FIG. 30, a variable gain circuit 301 and a power amplification circuit 302 amplify a modulated transmission signal. A switch circuit 303 is controlled based on a transmission control signal so as to be switched between an ON state and an OFF state, and outputs the amplified transmission signal intermittently. The transmission signal output from the switch circuit 303 is transmitted from an antenna 305 as an electric wave. A directional coupler 304 branches the transmission signal output from the switch circuit 303. A detection circuit 306 finds a power level of the transmission signal branched by the directional coupler 304. In a transmission state, a detection hold circuit 307 outputs a detected output from the detection circuit 306. In a non-transmission state, on the other hand, the detection hold circuit 307 holds the detected output in the previous transmission state and outputs the held output. A gain control circuit 308 compares a level of the signal output from the detection hold circuit 307 with a pre-set reference level, and controls a gain of the variable gain circuit 301 so as to reduce the difference between the above-described two levels.

In the above-described APC circuit, the detection hold circuit 307 outputs, to the gain control circuit 308, the signal whose level is substantially equal to the above-described reference level irrespective of whether it is in the transmission state or in the non-transmission state. Thus, the gain control circuit 308 outputs a gain control signal whose level is substantially constant. As a result, when the non-transmission state is switched into the transmission state, it is possible to quickly stabilize the level of the amplified transmission signal (the level corresponding to power of the electric wave emitted from the antenna 305).

However, the above-described conventional optical transmission device and the conventional radio communication system have the following problems. First, in the conventional optical transmission device, noise such as relative intensity noise (RIN) caused in the light emitting section or thermal noise caused in the light receiving section is amplified in the high frequency amplification section of the antenna side base station. As a result, in the non-transmission state of the radio signal, the antenna produces extraneous emissions, or noise in the downlink system has an adverse effect on the uplink system in the antenna side base station, thereby degrading the sensitivity of the uplink system in the non-transmission state of the radio signal. Also, in the conventional optical transmission device, the transmission timing signal is frequency multiplexed with the radio transmission signal and transmitted, which results in the high cost of the device due to the complicated circuits of the center station and the antenna side base station. Furthermore, in the optical transmission device, in general, a change in signal power with a change in optical power fluctuates in proportion to the square of the optical power. Thus, in order to accommodate a change in signal power with a change in optical power, the APC circuit has to be able to control the gain over a wide range of the optical power. As a result, there arises a problem that the APC circuit has to be provided with a high-performance variable attenuation circuit or variable amplification circuit.

SUMMARY OF THE INVENTION

Therefore, an object of the present invention is to provide an optical transmission device which is capable of reducing noise caused in the antenna side base station in the non-transmission state of a radio signal and transmitting the transmission timing signal with a simple structure, and a radio communication system using the above-described optical transmission device. Also, another object of the present invention is to provide an optical transmission device including a simple structured APC circuit for a burst radio signal and a radio communication system using the above-described optical transmission device.

The present invention has the following features to attain the objects mentioned above.

A first aspect of the present invention is directed to an optical transmission device for transmitting an optical signal, comprising: a variable light emitting section for obtaining a supply of a radio band transmission signal generated in a burst manner and a control signal indicating whether or not the transmission signal is generated, and outputting an optical signal having an intensity corresponding to the control signal and modulated by the transmission signal; a light receiving section for receiving the optical signal output from the variable light emitting section and converting the received optical signal into an electric signal; a light intensity detection section for detecting an intensity of the optical signal received by the light receiving section; and a high frequency amplification section for amplifying the electric signal output from the light receiving section in accordance with the light intensity detected by the light intensity detection section. Thus, it is possible to reduce noise in a device which receives the control signal, the noise caused when the control signal becomes a predetermined value, and transmit the control signal by a simple structure. For example, in the case of switching a transmission state and a non-transmission state based on the control signal, it is possible to reduce noise in the non-transmission state of a radio signal, the noise having an adverse effect on the device which receives the control signal.

In this case, the variable light emitting section may output an optical signal whose intensity is substantially equal to zero when a value of the control signal indicates that the transmission signal is not generated. As such, the optical signal is not output when the value of the control signal indicates that the transmission signal is not generated, thereby reducing noise output from the light receiving section.

Furthermore, the variable light emitting section may include: a bias supplying section for generating a bias current in accordance with the control signal; and a light emitting section for obtaining a supply of the bias current from the bias supplying section, and emitting light at an intensity corresponding to the transmission signal. Thus, it is possible to realize a simple structured variable light emitting section due to the use of a direct modulation scheme for optical signals.

Still further, the high frequency amplification section may amplify the electric signal output from the light receiving section by a first amplification factor if the light intensity detected by the light intensity detection section exceeds a predetermined threshold value, and amplify the electric signal by a second amplification factor smaller than the first amplification factor if the light intensity is equal to or smaller than the predetermined threshold value. Preferably, the second amplification factor is substantially equal to zero. Thus, in the case where the light intensity is equal to or smaller than the predetermined threshold value, it is possible to reduce noise in a circuit connected to a following stage of the high frequency amplification circuit by reducing an amplification factor applied to the electric signal output from the light receiving section.

Also, the optical transmission device may further comprise a control signal reconstruction section for outputting a signal indicating whether or not the light intensity detected by the light intensity detection section exceeds a predetermined threshold value, as a reconstructed control signal. Thus, it is possible to reconstruct the transmitted control signal in a receiving end by a simple structure based on the light intensity detected by the light intensity detection section.

Furthermore, the high frequency amplification section may amplify the electric signal output from the light receiving section so as to obtain a signal having a substantially constant power, by controlling an amplification factor in accordance with the light intensity detected by the light intensity detection section. Thus, a distinction is made between the transmission state and the non-transmission state based on the light intensity detected by the light intensity detection section, and automatic power control is performed for outputting, in the non-transmission state, a signal having substantially the same power as that in the transmission state. As such, even if the control signal multiplexed with the transmission signal is not received, the receiving end can demodulate the control signal and perform automatic power control based on the light intensity. Thus, it is possible to provide an optical transmission device including an automatic power control circuit (APC circuit) for a burst radio signal, the optical transmission device having a simple structure and capable of being realized at low cost.

In this case, the high frequency amplification section may include at least either of a first power control circuit for performing control so as to keep power of the amplified signal at a substantially constant level even if the intensity of the optical signal received by the light receiving section is changed and a second power control circuit for performing control so as to bring power of the amplified signal closer to a pre-set value by performing feedback control. Thus, automatic power control is divided into a first stage for accommodating a change in power of the radio transmission signal, the change caused by a change in optical power, and a second stage for accommodating a change in power of the radio transmission signal, the change caused by other than a change in optical power. As a result, it is possible to narrow a dynamic range of a signal to be input into the second stage automatic power control in the case where the first stage control is followed by the second stage control. Thus, automatic power control can be performed by a simple structure without using a high-performance variable amplification circuit or variable attenuation circuit.

The first power control circuit may include: a variable power control circuit for controlling a power level of the electric signal output from the light receiving section, in accordance with a supplied control voltage; a voltage generation circuit for generating a predetermined voltage which is substantially equal to a voltage corresponding to a light intensity to be detected by the light intensity detection section at the time of generation of the transmission signal; a switch circuit for selecting a voltage corresponding to the light intensity detected by the light intensity detection section when the light intensity exceeds a predetermined threshold value, and selecting the voltage generated by the voltage generation circuit when the light intensity is equal to or smaller than the predetermined threshold value; and a first control voltage output circuit for obtaining the control voltage based on the voltage selected by the switch circuit, and outputting the obtained control voltage to the variable power control circuit. Furthermore, by connecting the voltage generation circuit and the first control voltage output circuit in inverse order, the voltage generation circuit may be caused to generate a predetermined voltage which is substantially equal to a voltage to be obtained by the first control voltage output circuit at the time of generation of the transmission signal. Still further, the first power control circuit may include, in place of the voltage generation circuit and the switch circuit, a sample-hold circuit for outputting a voltage corresponding to the light intensity detected by the light intensity detection section if the light intensity exceeds a predetermined threshold value, and outputting a voltage held after sampling the voltage corresponding to the light intensity while the light intensity exceeds the predetermined threshold value if the light intensity is equal to or smaller than the predetermined threshold value. Also, by connecting the sample-hold circuit and the first control voltage output circuit in inverse order, the sample-hold circuit may hold the voltage obtained by the first control voltage output circuit while the light intensity detected by the light intensity detection section exceeds the predetermined threshold value. In either case, even in the non-transmission state, the control voltage which is substantially equal to the control voltage in the transmission state is supplied to the variable power control circuit by the action of the voltage generation circuit and the switch circuit (or the sample-hold circuit). Thus, it is possible to perform automatic power control for the transmission signal generated in a burst manner as in the case of a signal generated in a continuous manner.

Especially, the first control voltage output circuit may include a logarithmic amplifier for outputting a logarithmic value of an input signal. As a result, it is possible to control the amount of amplification or attenuation in the variable power control circuit in proportion to the optical power by supplying the log-transformed voltage to the variable attenuation circuit as a control voltage, thereby performing automatic power control with high precision.

The second power control circuit may include: a variable power control circuit for controlling a power level of an electric signal output from a previous stage circuit, in accordance with a supplied control voltage; an envelope detection circuit for performing envelope detection for a signal output from the variable power control circuit, and obtaining a power level of the signal; a voltage generation circuit for generating a predetermined voltage which is substantially equal to a voltage corresponding to a power level to be obtained by the envelope detection circuit at the time of generation of the transmission signal; a switch circuit for selecting a voltage corresponding to the power level obtained by the envelope detection circuit if the light intensity detected by the light intensity detection section exceeds a predetermined threshold value, and selecting the voltage generated by the voltage generation circuit if the light intensity is equal to or smaller than the predetermined threshold value; and a second control voltage output circuit for obtaining the control voltage based on the voltage selected by the switch circuit, and outputting the obtained control voltage to the variable power control circuit. Furthermore, by connecting the voltage generation circuit and the second control voltage output circuit in inverse order, the voltage generation circuit may be caused to generate a predetermined voltage which is substantially equal to a voltage to be obtained by the second control voltage output circuit at the time of generation of the transmission signal. Still further, the second power control circuit may include, in place of the voltage generation circuit and the switch circuit, a sample-hold circuit for outputting a voltage corresponding to the power level obtained by the envelope detection circuit if the light intensity detected by the light intensity detection section exceeds a predetermined threshold value, and outputting a voltage held after sampling the voltage corresponding to the power level obtained by the envelope detection circuit while the light intensity exceeds the predetermined threshold value if the light intensity is equal to or smaller than the predetermined threshold value. Also, by connecting the sample-hold circuit and the second control voltage output circuit in inverse order, the sample-hold circuit may hold the voltage obtained by the second control voltage output circuit while the light intensity exceeds the predetermined threshold value. In either case, even in the non-transmission state, the control voltage which is substantially equal to the control voltage in the transmission state is supplied to the variable power control circuit by the action of the voltage generation circuit and the switch circuit (or the sample-hold circuit). Thus, it is possible to perform automatic power control for the transmission signal generated in a burst manner as in the case of a signal generated in a continuous manner.

Especially, the second control voltage output circuit may include an averaging circuit for outputting an average value of an input signal, a peak-hold circuit for holding a peak value of an input signal, or a select circuit for causing either the peak-hold circuit or the averaging circuit to function effectively. The use of the averaging circuit allows a signal (for example, a CDMA (Code Division Multiple Access) signal), for which automatic power control cannot be performed based on a peak value due to uncertainty in a peak level, to be subjected to automatic power control. The use of the peak-hold circuit allows a signal (for example, an ASK signal), whose duty ratio varies depending on a bit pattern of data to be transmitted, to be subjected to automatic power control. The use of the select circuit allows a selection to be made in accordance with a supplied select signal whether automatic power control is performed based on an average value of a signal or based on a peak value of the signal, whereby it is possible to perform automatic power control for various types of transmission signals.

A second aspect of the present invention is directed to an optical transmission method for transmitting an optical signal, comprising the steps of: obtaining a supply of a radio band transmission signal generated in a burst manner and a control signal indicating whether or not the transmission signal is generated, and outputting an optical signal having an intensity corresponding to the control signal and modulated by the transmission signal; receiving the optical signal and converting the received optical signal into an electric signal; detecting an intensity of the received optical signal; and amplifying the electric signal in accordance with the detected light intensity. Thus, it is possible to reduce noise in a device which receives the control signal, the noise caused when the control signal becomes a predetermined value, and transmit the control signal by a simple structure. For example, in the case of switching a transmission state and a non-transmission state based on the control signal, it is possible to reduce noise in the non-transmission state, the noise having an adverse effect on the device which receives the control signal.

In this case, the step of amplifying the electric signal amplifies the electric signal so as to obtain a signal having a substantially constant power, by controlling an amplification factor in accordance with the detected light intensity. Thus, a distinction is made between the transmission state and the non-transmission state based on the light intensity detected by the light intensity detection section, and automatic power control is performed for outputting, in the non-transmission state, a signal having substantially the same power as that in the transmission state. As such, even if the control signal multiplexed with the transmission signal is not received, a receiving end can reconstruct the control signal and perform automatic power control based on the light intensity. Thus, it is possible to provide an optical transmission method performing automatic power control for a burst radio signal, the optical transmission method having a simple structure and capable of being realized at low cost.

A third aspect of the present invention is directed to a radio communication system for transmitting and receiving a radio signal, comprising: a variable light emitting section for obtaining a supply of a radio band transmission signal generated in a burst manner and a control signal indicating whether or not the transmission signal is generated, and outputting an optical signal having an intensity corresponding to the control signal and modulated by the transmission signal; a light receiving section for receiving the optical signal output from the variable light emitting section and converting the received optical signal into an electric signal; a light intensity detection section for detecting an intensity of the optical signal received by the light receiving section; a high frequency amplification section for amplifying the electric signal output from the light receiving section in accordance with the light intensity detected by the light intensity detection section; an electric wave transmitting and receiving section having a function of transmitting an electric wave based on the electric signal amplified by the high frequency amplification section, and a function of receiving an electric wave and outputting a radio band reception signal; a transmitting section for transmitting the reception signal; and a receiving section for receiving the reception signal transmitted from the transmitting section. As a result, it is possible to reduce noise in a device which receives the control signal, the noise caused when the control signal becomes a predetermined value, and transmit the control signal by a simple structure. For example, in the case of switching a transmission state and a non-transmission state based on the control signal, it is possible to reduce noise to be output from the light receiving section, in the non-transmission state of the radio signal.

In this case, the electric wave transmitting and receiving section may transmit the electric wave if the light intensity detected by the light intensity detection section exceeds a predetermined threshold value, and receive the electric wave if the light intensity is equal to or smaller than the predetermined threshold value. Thus, it is possible to easily switch an operation of the electric wave transmitting and receiving section using the transmitted control signal.

Furthermore, the transmitting section may include an uplink light emitting section for outputting an optical signal modulated by the reception signal, and the receiving section may include an uplink light receiving section for receiving the optical signal output from the uplink light emitting section, and outputting the reception signal as an electric signal. As a result, it is possible to provide a radio communication system using a radio optical fiber technique also in an uplink system as in the case of a downlink system. Still further, the transmitting section may include a radio demodulation section for demodulating the reception signal and an uplink light emitting section for outputting an optical signal modulated by a signal output from the radio demodulation section, and the receiving section may include an uplink light receiving section for receiving the optical signal output from the uplink light emitting section, and outputting the reception signal as an electric signal. As a result, it is possible to provide a radio communication system using the radio optical fiber technique in the downlink system and using a baseband optical communications in the uplink system.

These and other objects, features, aspects and advantages of the present invention will become more apparent from the following detailed description of the present invention when taken in conjunction with the accompanying drawings.

DESCRIPTION OF THE PREFERRED EMBODIMENTS (First Embodiment)

Figure 1:
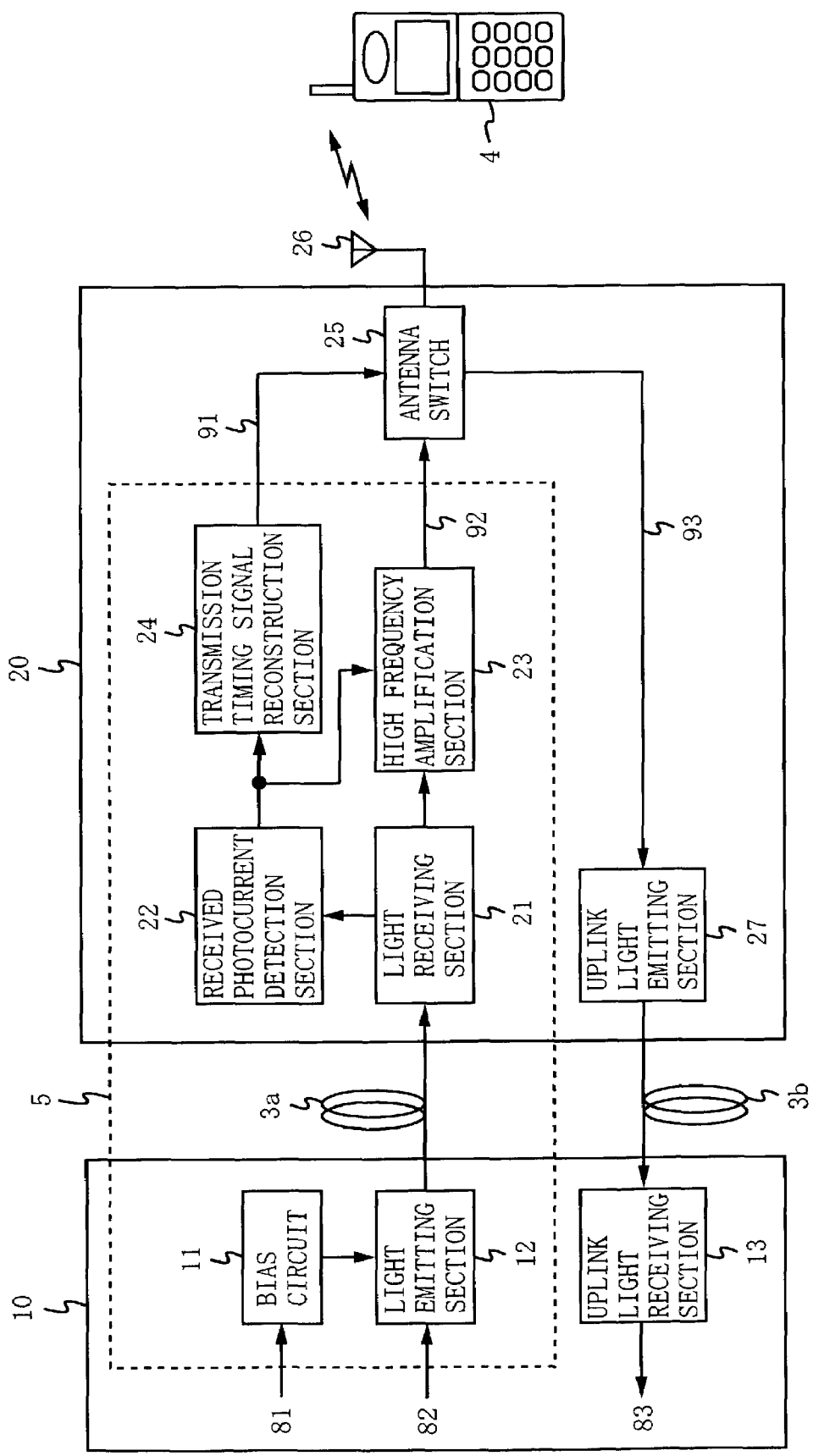
FIG. 1 is a block diagram showing the structure of an optical transmission device and a radio communication system according to a first embodiment of the present invention.

FIG. 1 is a block diagram showing the structure of an optical transmission device and a radio communication system according to a first embodiment of the present invention. The radio communication system shown in FIG. 1 includes a bias circuit 11, a light emitting section 12, an uplink light receiving section 13, a light receiving section 21, a received photocurrent detection section 22, a high frequency amplification section 23, a transmission timing signal reconstruction section 24, an antenna switch 25, an antenna 26, an uplink light emitting section 27, a downlink optical fiber 3a, and an uplink optical fiber 3b. The bias circuit 11, the light emitting section 12, and the uplink light receiving section 13 are provided in a center station 10, and the light receiving section 21, the received photocurrent detection section 22, the high frequency amplification section 23, the transmission timing signal reconstruction section 24, the antenna switch 25, the antenna 26, and the uplink light emitting section 27 are provided in an antenna side base station 20.

Figure 27:
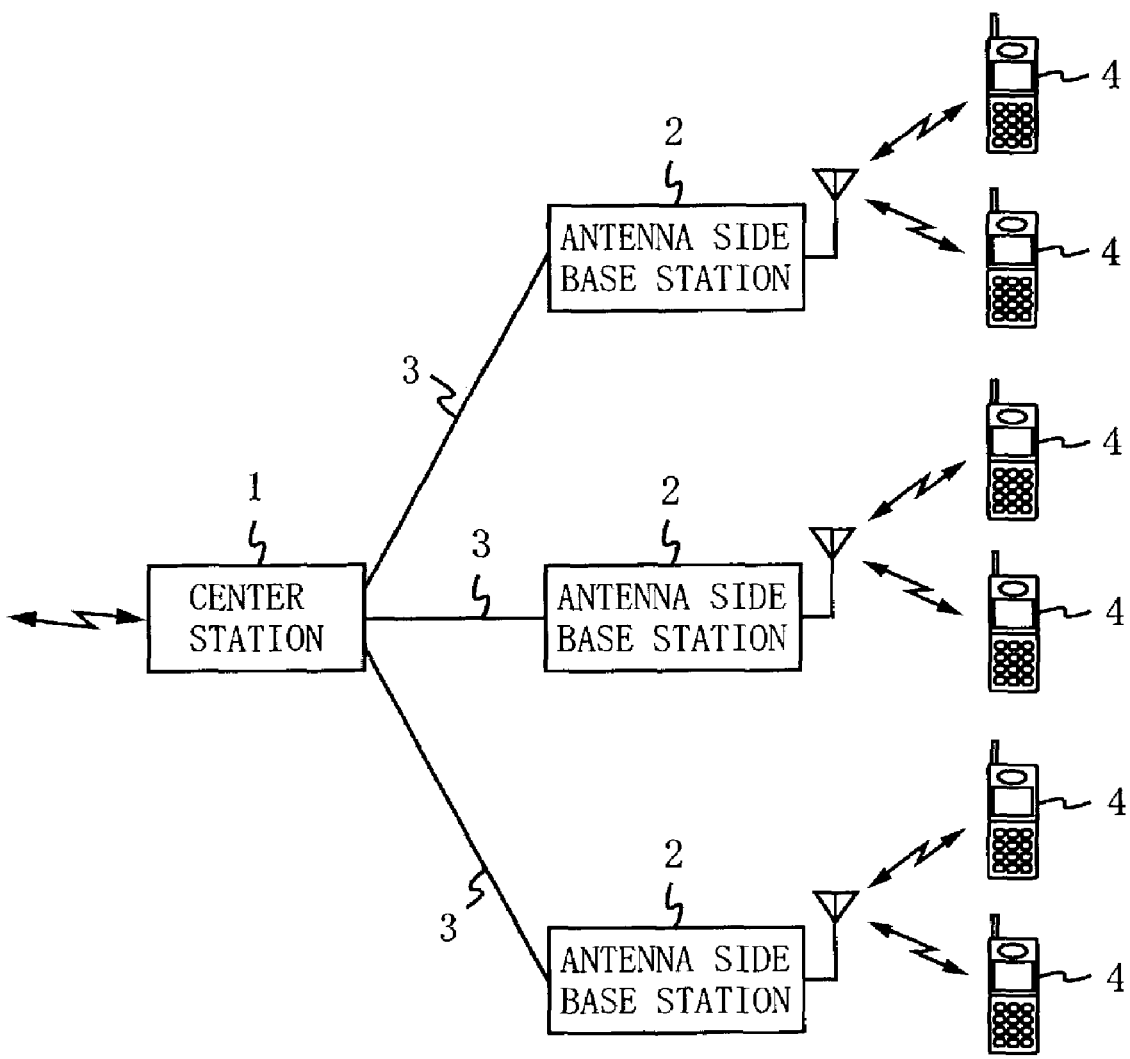
FIG. 27 is a block diagram showing the structure of a mobile communication system using a ROF technique.
Figure 28:
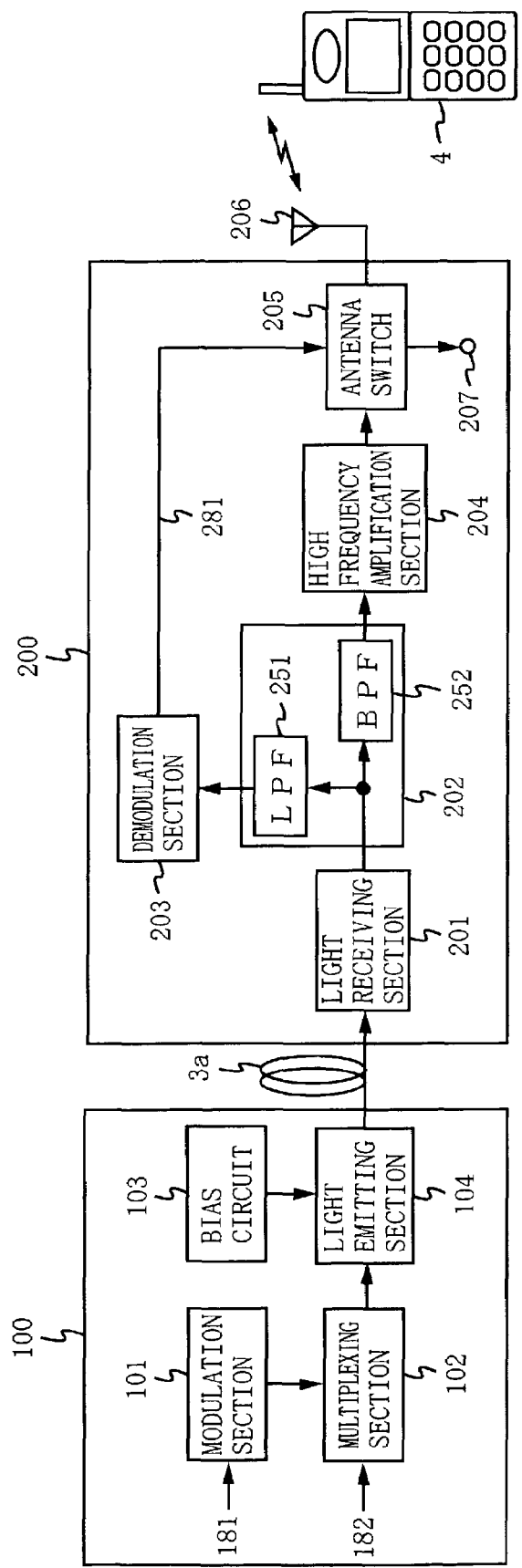
FIG. 28 is a block diagram showing the structure of a conventional optical transmission device and a conventional radio communication system.
Figure 29:
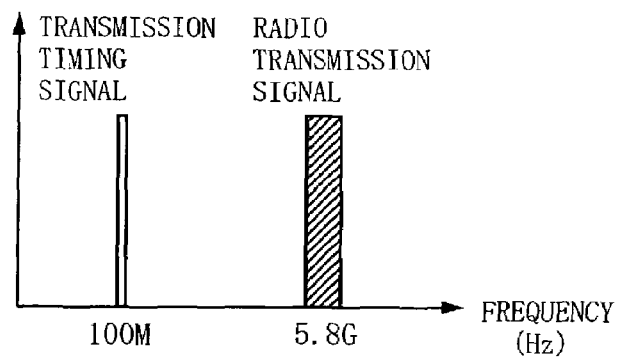
FIG. 29 is an illustration showing a spectrum of a radio signal input into a light emitting section of the conventional optical transmission device.
Figure 30:
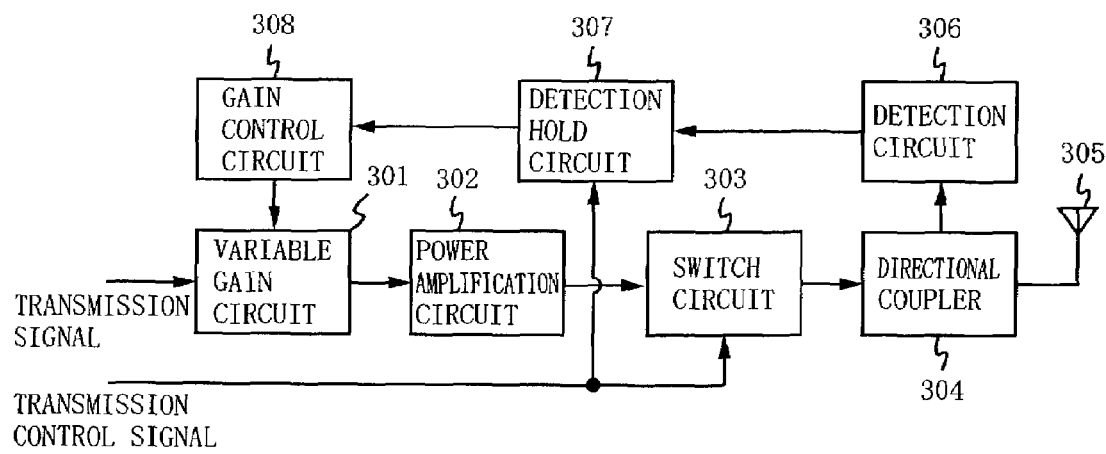
FIG. 30 is a block diagram showing the structure of a conventional automatic power control circuit.

The center station 10 is connected with the antenna side base station 20 using the downlink optical fiber 3a and the uplink optical fiber 3b so as to be capable of performing bi-directional communications therebetween. Note that the center station 10 and the antenna side base station 20 shown in FIG. 1 correspond to the center station 1 and the antenna side base station 2 shown in FIG. 27, respectively, and the downlink optical fiber 3a and the uplink optical fiber 3b shown in FIG. 1 correspond to the optical fiber 3 shown in FIG. 27.

In FIG. 1, an optical transmission device 5 includes the bias circuit 11, the light emitting section 12, the light receiving section 21, the received photocurrent detection section 22, the high frequency amplification section 23, the transmission timing signal reconstruction section 24, and the downlink optical fiber 3a. Hereinafter, the detailed structure of the optical transmission device 5 is described with reference to FIG. 1.

A transmission timing signal 81 and a radio transmission signal 82 are input into the optical transmission device 5. The radio transmission signal 82 is a radio signal to be transmitted to the mobile phone 4, the radio signal modulated using ASK or PSK, etc. The transmission timing signal 81 is a control signal indicating whether the radio communication system is in a transmission state or in a non-transmission state, that is, indicating whether or not the radio transmission signal 82 to be transmitted is generated. Hereinafter, it is assumed that a value of the transmission timing signal 81 is 1 when the radio communication system is in the transmission state, and a value thereof is 0 when the radio communication system is in the non-transmission state. The radio transmission signal 82 is transmitted in a burst manner in accordance with the transmission timing signal 81.

As will be shown below, the bias circuit 11 and the light emitting section 12 are included in a variable light emitting section outputting an optical signal having an intensity corresponding to the transmission timing signal 81 and modulated based on the radio transmission signal 82. The transmission timing signal 81 is input into the bias circuit 11, and the radio transmission signal 82 is input into the light emitting section 12. In accordance with the input transmission timing signal 81, the bias circuit 11 generates a bias current to be supplied to the light emitting section 12. More specifically, when the value of the transmission timing signal 81 is 1 (transmission state), the bias circuit 11 generates a first bias current. On the other hand, when the value of the transmission timing signal 81 is 0 (non-transmission state), the bias circuit 11 generates a second bias current smaller than the first bias current. Here, a value of the first bias current is set so that an intensity of the optical signal output from the light emitting section 12 is adequate for performing optical transmission, and a value of the second bias current is set so that the intensity of the optical signal output from the light emitting section 12 is substantially equal to zero.

The light emitting section 12 emits light at an intensity corresponding to the radio transmission signal 82. In other words, the light emitting section 12 outputs the optical signal whose intensity is modulated by the radio transmission signal 82. Also, the light emitting section 12 obtains a supply of a bias current changing with the transmission timing signal 81 from the bias circuit 11. Therefore, when the value of the transmission timing signal 81 is 1 (transmission state), the variable light emitting section including the bias circuit 11 and the light emitting section 12 outputs the optical signal whose intensity is modulated based on the radio transmission signal 82. On the other hand, when the value of the transmission timing signal 81 is 0 (non-transmission state), the above-described variable light emitting section outputs the optical signal whose intensity is substantially equal to zero. In other words, the above-described variable light emitting section outputs no optical signal in the non-transmission state. The optical signal output from the light emitting section 12 passes through the downlink optical fiber 3a, and reaches the light receiving section 21.

The light receiving section 21 receives the optical signal output from the light emitting section 12 and transmitted over the downlink optical fiber 3a, and converts the received optical signal into an electric signal. The electric signal obtained as described above is output to the high frequency amplification section 23. On the other hand, the received photocurrent detection section 22 detects an intensity of the optical signal received by the light receiving section 21. More specifically, the received photocurrent detection section 22 obtains an intensity of the optical signal by detecting a current (received photocurrent) passing through the light receiving section 21 when the optical signal is received by the light receiving section 21. The light intensity obtained by the received photocurrent detection section 22 is output to the high frequency amplification section 23 and the transmission timing signal reconstruction section 24.

The electric signal output from the light receiving section 21 and the light intensity detected by the received photocurrent detection section 22 are input into the high frequency amplification section 23. In accordance with the input light intensity, the high frequency amplification section 23 amplifies the electric signal output from the light receiving section 21. More specifically, the high frequency amplification section 23 having a threshold value T1 with respect to a light intensity amplifies the electric signal by a first amplification factor when the input light intensity exceeds the threshold value T1, and amplifies the electric signal by a second amplification factor smaller than the first amplification factor when the above-described intensity is equal to or smaller than the threshold value T1. As the second amplification factor, a value substantially equal to zero is used. Also, the threshold value T1 is set at a value allowing a time period when the value of the transmission timing signal 81 is 1 (transmission state) and a time period when the value thereof is 0 (non-transmission state) to be distinguished.

As a result, when the value of the transmission timing signal 81 is 1 (transmission state), the high frequency amplification section 23 amplifies the electric signal output from the light receiving section 21 by the first amplification factor. On the other hand, when the transmission timing signal 81 is 0 (non-transmission state), the high frequency amplification section 23 outputs no signal. Thus, when the value of the transmission timing signal 81 is 0 (non-transmission state), a circuit connected to a following stage of the high frequency amplification section 23 is isolated from the high frequency amplification section 23 in terms of the signal flow, thereby becoming unaffected by the optical signal received by the light receiving section 21.

Based on the intensity of the optical signal received by the light receiving section 21, the transmission timing signal reconstruction section 24 reconstructs a transmission timing signal 91 varying in a manner similar to the transmission timing signal 81. More specifically, as in the case of the high frequency amplification section 23, the transmission timing signal reconstruction section 24, having a threshold value T2 with respect to a light intensity, outputs a value 1 indicating the transmission state when the input light intensity exceeds the threshold value T2, and outputs a value 0 indicating the non-transmission state when the light intensity is equal to or smaller than the threshold value T2. Note that, in a typical antenna side base station, the threshold value T1 of the high frequency amplification section 23 coincides with the threshold value T2 of the transmission timing signal reconstruction section 24, but the above-described two threshold values are not necessarily required to coincide with each other.

As described above, according to the optical transmission device 5 of the present embodiment, when the radio communication system is in the non-transmission state, the optical signal is not transmitted from the center station 10 to the antenna side base station 20, and the level of the signal output from the high frequency amplification section 23 is substantially equal to zero. Thus, the noise level of the antenna side base station 20 in the non-transmission state is reduced. Also, the light receiving section 21 does not receive the optical signal in the non-transmission state, thereby reducing the adverse effects of the relative intensity noise on the light receiving section 21 and reducing the noise level of the antenna side base station 20 in the non-transmission state. Thus, it is possible to improve the sensitivity of the antenna side base station 20. Furthermore, the bias circuit 11, the received photocurrent detection section 22, and the transmission timing signal reconstruction section 24 are used in place of a modulation section, a multiplexing section, a demultiplexing section, and a demodulation section, which are necessary components in the conventional optical transmission device, whereby the optical transmission device 5 having a simpler structure than that of the conventional optical transmission device can reconstruct the transmission timing signal in the antenna side base station 20.

Figure 2:
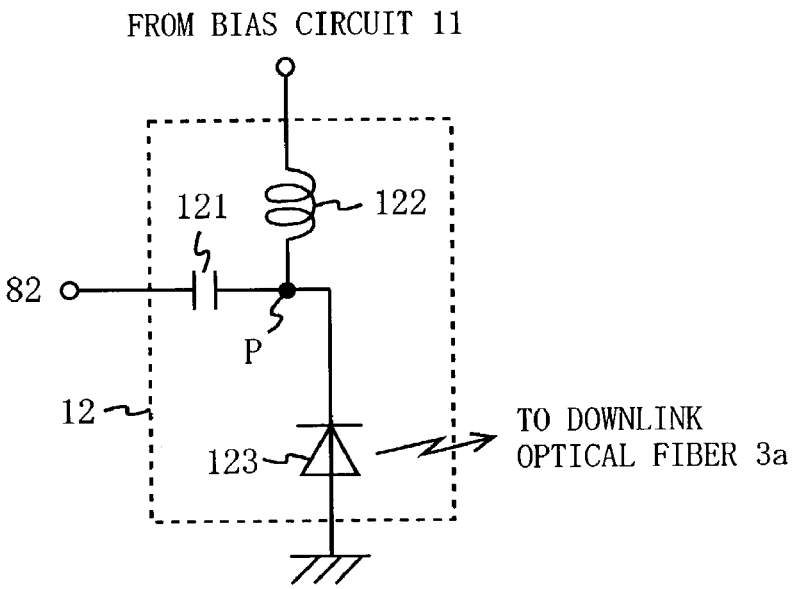
FIG. 2 is a circuit diagram showing the detailed structure of a light emitting section of the optical transmission device according to the first embodiment of the present invention.

Hereinafter, examples of the components included in the optical transmission device 5 are described in a concrete manner. FIG. 2 is a circuit diagram showing the detailed structure of the light emitting section 12. The light emitting section 12 shown in FIG. 2 includes a capacitor 121, an inductor 122, and a semiconductor laser 123 that is a light emitting element. One terminal of the semiconductor laser 123 is connected to the bias circuit 11 via the inductor 122, and the other terminal thereof is grounded. Thus, a laser bias is supplied to the semiconductor laser 123 by the bias circuit 11, and the semiconductor laser 123 emits light when a bias current supplied by the bias circuit 11 exceeds a predetermined value. Also, the radio transmission signal 82 is applied, via the capacitor 121, to a junction point P between the inductor 122 and the semiconductor laser 123. As a result, a potential of the junction point P and an intensity of the optical signal output from the semiconductor laser 123 are changed with a change in the radio transmission signal 82.

Figure 3:
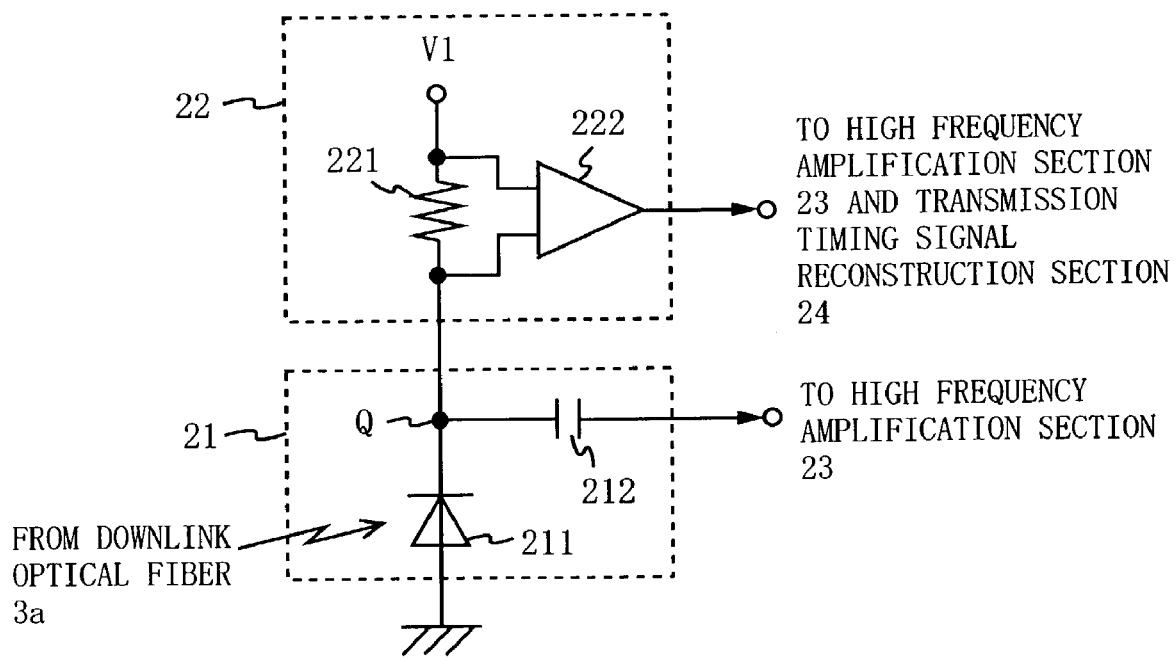
FIG. 3 is a circuit diagram showing the detailed structure of a light receiving section and a received photocurrent detection section of the optical transmission device according to the first embodiment of the present invention.

FIG. 3 is a circuit diagram showing the detailed structure of the light receiving section 21 and the received photocurrent detection section 22. As shown in FIG. 3, the light receiving section 21 includes a photodiode 211 that is a light receiving element and a capacitor 212, and the received photocurrent detection section 22 includes a resistance 221 and a differential amplification circuit 222. The photodiode 211 and the resistance 221 are connected in series. A predetermined bias current V1 is applied to one terminal of a circuit including the above-described two elements connected in series, and the other terminal is grounded. Also, a junction point Q between the photodiode 211 and the resistance 221 is connected to an input terminal of the high frequency amplification section 23 via the capacitor 212. Two input terminals of the differential amplification circuit 222 are connected to the respective ends of the resistance 221.

When an optical signal is input from the downlink optical fiber 3a, a current corresponding to an intensity of the optical signal passes through the photodiode 211. Thus, a potential of the junction point Q is changed with a change in an intensity of the input optical signal, and an electric signal varying in the same manner as the radio transmission signal 82 is supplied to the high frequency amplification section 23. Also, the current passing through the resistance 221 is changed with a change in an intensity of the input optical signal. The differential amplification circuit 222 measures the current passing through the resistance 221 by comparing the potential of one end of the resistance 221 with the potential of the other end thereof, and outputs the measured current as an intensity of the received optical signal.

Figure 4:
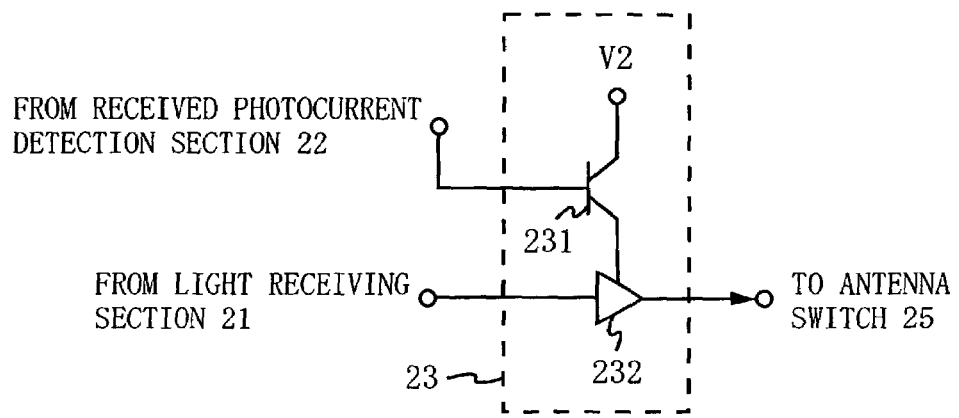
FIG. 4 is a circuit diagram showing the detailed structure of a high frequency amplification section of the optical transmission device according to the first embodiment of the present invention.

FIG. 4 is a circuit diagram showing the detailed structure of the high frequency amplification section 23. The high frequency amplification section 23 shown in FIG. 4 includes a transistor 231 and an amplification circuit 232. The transistor 231 functions as a switch for performing switching between a state of supplying a bias current V2 to the amplification circuit 232 and a state of supplying no bias current V2 thereto. An intensity of the optical signal received by the light receiving section 21 is input into a control terminal of the transistor 231 from the received photocurrent detection section 22. When the input intensity of the optical signal exceeds the predetermined threshold value T1, the transistor 231 conducts, and the bias voltage V2 is supplied to the amplification circuit 232. In this case, the amplification circuit 232 amplifies the electric signal output from the light receiving section 21 by a predetermined amplification factor. On the other hand, when the input intensity of the optical signal is equal to or smaller than the predetermined threshold value T1, the transistor 231 does not conduct, and the bias voltage V2 is not supplied to the amplification circuit 232. In this case, the amplification circuit 232 outputs a signal whose level is substantially equal to zero.

Figure 5:
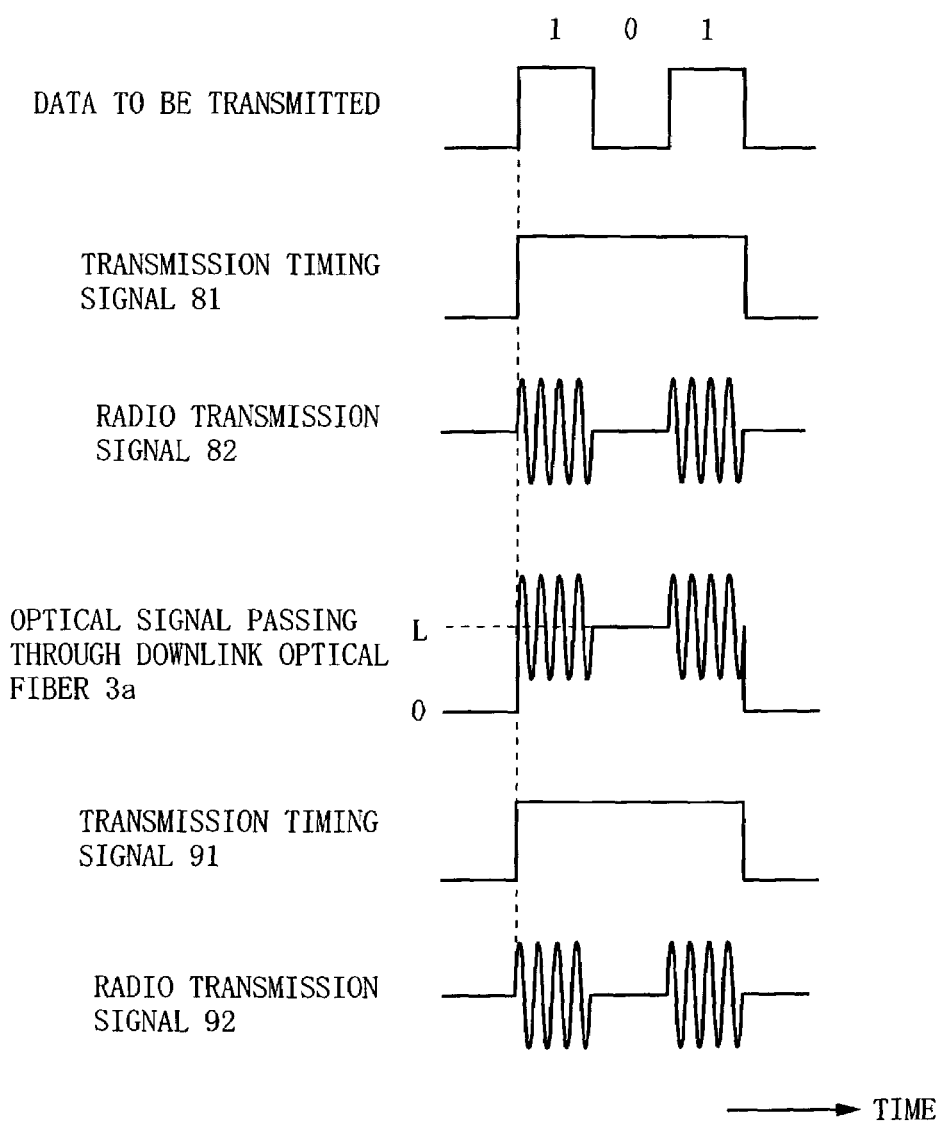
FIG. 5 is a signal waveform diagram in the case where an ASK modulated carrier is transmitted using the optical transmission device according to the first embodiment of the present invention.

FIG. 5 is a signal waveform diagram in the case where an ASK modulated carrier is transmitted using the optical transmission device 5. In FIG. 5, data to be transmitted is three bit data ("101"), and a vertical scaling factor is appropriately adjusted in order to facilitate an understanding of the drawing. The value of the transmission timing signal 81 (a signal in the second line of FIG. 5) is 1 when there is data to be transmitted, and the value thereof is 0 when there is no data to be transmitted. In this example, the value of the transmission timing signal 81 is 1 only during a time period when the three bit data "101" is transmitted. The radio transmission signal 82 (a signal in the third line of FIG. 5) is a radio band signal obtained by performing ASK modulation for a carrier having a predetermined frequency by the data "101" to be transmitted. The radio transmission signal 82 is changed only during the time period when the value of the transmission timing signal 81 is 1 (transmission state).

An intensity of the optical signal (a signal in the fourth line of FIG. 5) passing through the downlink optical fiber 3a is changed with respect to a predetermined level L when the value of the transmission timing signal 81 is 1 (transmission state). On the other hand, the intensity is substantially equal to zero when the value of the transmission timing signal 81 is 0 (non-transmission state). The transmission timing signal 91 (a signal in the fifth line of FIG. 5), which is output from the transmission timing signal reconstruction section 24, varies in a manner similar to the transmission timing signal 81. Also, a radio transmission signal 92 (a signal in the bottom line of FIG. 5), which is output from the high frequency amplification section 23, varies in a manner similar to the radio transmission signal 82. As described above, the optical transmission device 5 allows the transmission timing signal and the ASK modulated radio transmission signal which have been input at the center station 10 to be correctly reconstructed at the antenna side base station 20.

Figure 6:
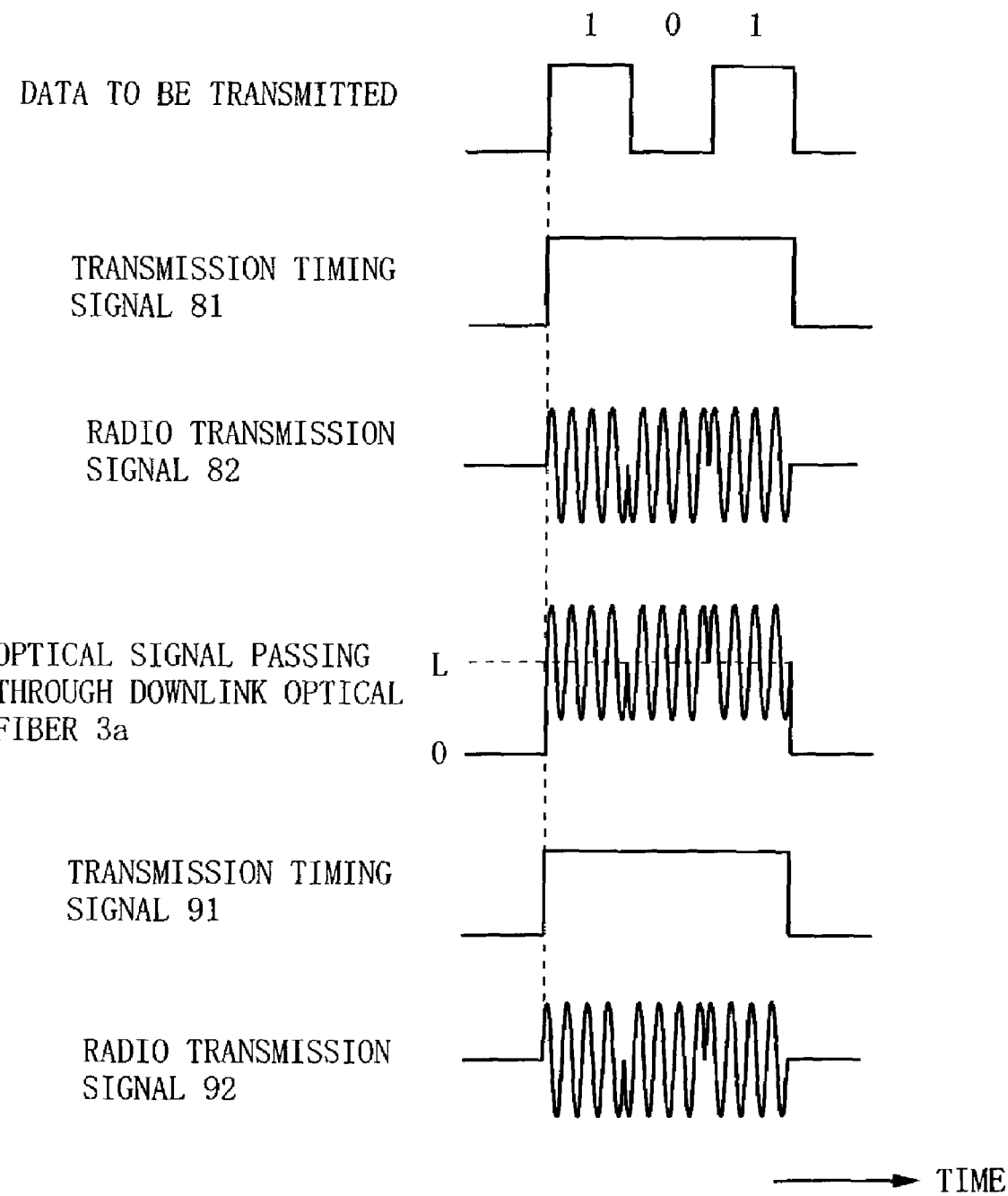
FIG. 6 is a signal waveform diagram in the case where a PSK modulated carrier is transmitted using the optical transmission device according to the first embodiment of the present invention.

The optical transmission device 5 has the above-described features irrespective of what type of modulation method has been applied to the radio transmission signal 82. For example, FIG. 6 is a signal waveform diagram in the case where a PSK modulated carrier is transmitted using the optical transmission device 5. Comparison between FIGS. 5 and 6 shows that FIG. 6 differs from FIG. 5 only in the waveforms of the radio transmission signals 82 and 92. Thus, as is the case with transmission of the ASK modulated carrier, the optical transmission device 5 allows the transmission timing signal and the PSK modulated radio transmission signal which have been input at the center station 10 to be correctly reconstructed at the antenna side base station 20.

Note that, in the signal waveform diagrams shown in FIGS. 5 and 6, when the transmission timing signal 81 is changed from the value 0 (non-transmission state) to the value 1 (transmission state), a timing of the above-described change does not have to coincide exactly with a timing of the appearance of the modulated radio transmission signal 82. In consideration of, for example, a transient response time of the light emitting section 12, the transmission timing signal 81 may be changed from the value 0 to the value 1 before the appearance of the modulated radio transmission signal 82 by a predetermined time.

Effects of the optical transmission device 5 will be described in a quantitative manner. By way of example, a case where a level of noise output from the light receiving section is −165 dBm/Hz due to influences of relative intensity noise in the light emitting section, shot noise in the light receiving section, and thermal noise, and a gain value of the high frequency amplification section is 60 dB will be described. Under the above-described condition, if the high frequency amplification section of the conventional optical transmission device unconditionally amplifies an electric signal output from the light receiving section, the noise level of the output signal of the high frequency amplification section comes to −105 dBm/Hz. On the other hand, according to the optical transmission device 5, in the non-transmission state of the radio signal, the high frequency amplification section 23 outputs a signal whose level is substantially equal to zero. Thus, the noise level of the radio transmission signal 92 in the non-transmission state is equal to the level of the thermal noise, that is, in the vicinity of −174 dBm/Hz. As such, compared to the conventional optical transmission device, the optical transmission device 5 allows the noise level of the radio transmission signal 92 in the non-transmission state to be reduced significantly.

As described above, according to the optical transmission device of the present embodiment, the variable light emitting section including the bias circuit and the light emitting section outputs an optical signal having an intensity corresponding to the transmission timing signal and modulated based on the radio band transmission signal. Also, the received photocurrent detection section detects an intensity of an optical signal received by the light receiving section. Based on the above-described intensity, the high frequency amplification section amplifies the electric signal output from the light receiving section, and the transmission timing signal reconstruction section reconstructs the transmission timing signal. As a result, it is possible to reduce the noise in the antenna side base station in the non-transmission state of the radio signal, and provide a simple structured optical transmission device that can transmit the transmission timing signal.

Next, referring to FIG. 1 again, a method for controlling the radio communication system by utilizing the feature of the optical transmission device 5 is described. The radio transmission signal 92 output from the high frequency amplification section 23 and the transmission timing signal 91 output from the transmission timing signal reconstruction section 24 are input into the antenna switch 25 connected to a following stage of the high frequency amplification section 23. The antenna switch 25 changes the function of the antenna 26 based on the transmission timing signal 91. When the light intensity detected by the received photocurrent detection section 22 exceeds the threshold value T2 of the transmission timing signal reconstruction section 24 and the value of the transmission timing signal 91 is 1 (transmission state), the antenna 26 transmits an electric wave based on the radio transmission signal 92. On the other hand, when the light intensity detected by the received photocurrent detection section 22 is equal to or smaller than the threshold value T2 and the value of the transmission timing signal 91 is 0 (non-transmission state), the antenna 26 receives an electric wave. The above descriptions are summarized as follows. An electric wave transmitting and receiving section including the antenna switch 25 and the antenna 26 transmits an electric wave when the light intensity detected by the received photocurrent detection section 22 exceeds the threshold value T2, and receives an electric wave when the intensity is equal to or smaller than the threshold value T2.

When the antenna 26 receives an electric wave, the antenna switch 25 outputs the received radio band signal to the uplink light emitting section 27 as a radio reception signal 93. The uplink light emitting section 27 sends the optical signal modulated based on the radio reception signal to the uplink optical fiber 3b. The optical signal output from the uplink light emitting section 27 passes through the uplink optical fiber 3b, and reaches the uplink light receiving section 13. The uplink light receiving section 13 receives the optical signal output from the uplink light emitting section 27 and transmitted over the uplink optical fiber 3b, converts the received optical signal into an electric signal, and outputs the electric signal as a radio reception signal 83.

As described above, the radio communication system of the present embodiment has a simple but adequate structure for transmitting the transmission timing signal to the antenna side base station, and can change the function of the electric wave transmitting and receiving section including the antenna switch and the antenna using the above-described transmission timing signal. Also, when the radio communication system is in the non-transmission state, no optical signal is transmitted from the center station to the antenna side base station, and the level of the signal output from the high frequency amplification section is substantially equal to zero. Thus, in the non-transmission state, the antenna switch is isolated from the high frequency amplification section in terms of the signal flow, thereby becoming unaffected by the optical signal received by the light receiving section. As a result, it is possible to prevent the uplink system from being adversely affected by the noise caused in the downlink system, thereby preventing the sensitivity of the uplink system from being degraded.

(Second Embodiment)

Figure 7:
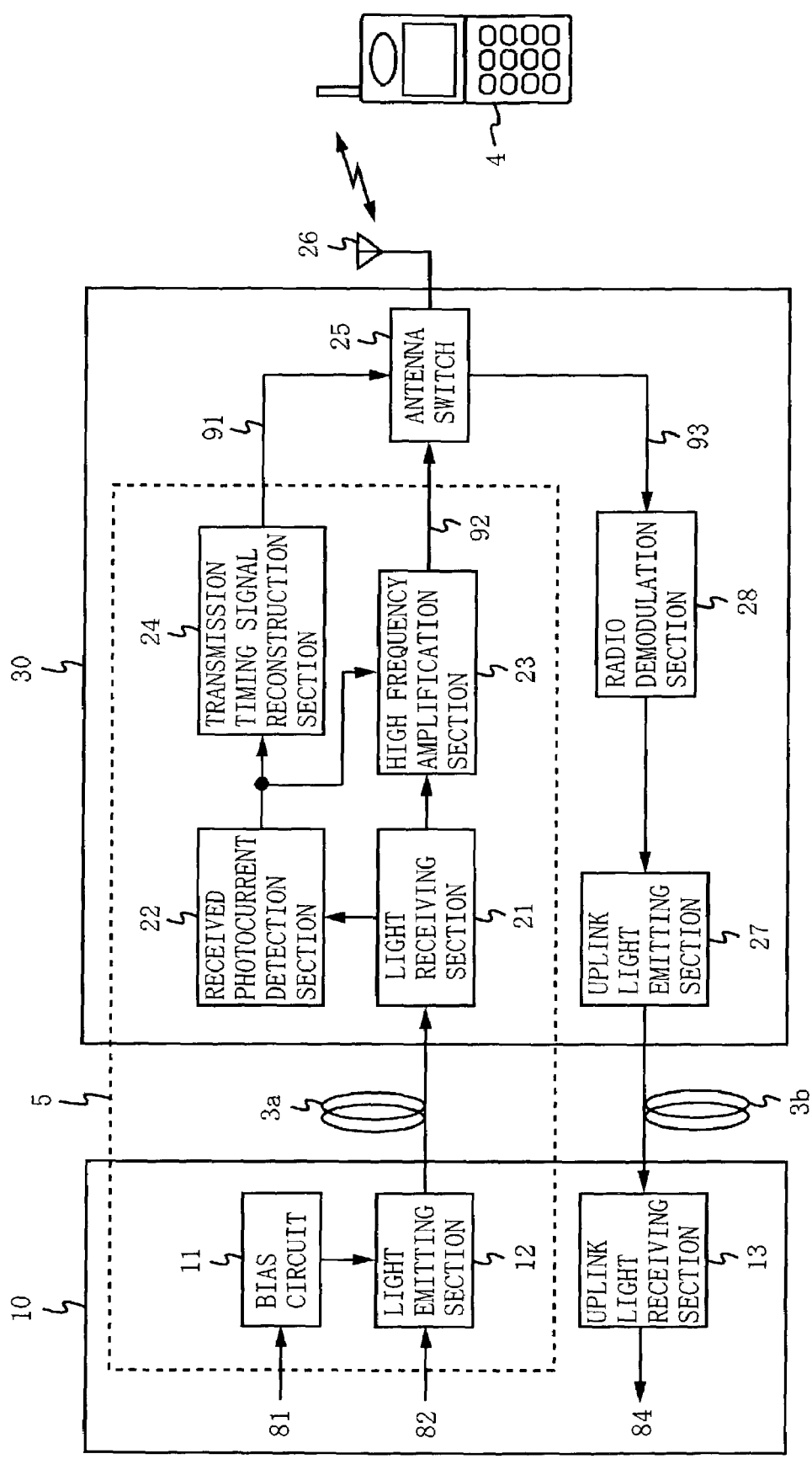
FIG. 7 is a block diagram showing the structure of an optical transmission device and a radio communication system according to a second embodiment of the present invention.

FIG. 7 is a block diagram showing the structure of an optical transmission device and a radio communication system according to a second embodiment of the present invention. The radio communication system shown in FIG. 7 differs from the radio communication system according to the first embodiment in that a radio demodulation section 28 is additionally included. Any components of the second embodiment that function in similar manners to their counterparts of the first embodiment are denoted by like numerals, with the descriptions thereof omitted.

In the antenna side base station 30 according to the present embodiment, the radio reception signal 93 output from the antenna switch 25 is input into the radio demodulation section 28. The radio demodulation section 28 obtains a baseband signal by demodulating the input radio reception signal 93. The uplink light emitting section 27 sends, to the uplink optical fiber 3b, the optical signal whose intensity is modulated based on the signal demodulated by the radio demodulation section 28. The optical signal output from the uplink light emitting section 27 passes through the uplink optical fiber 3b, and reaches the uplink light receiving section 13. The uplink light receiving section 13 receives the optical signal output from the uplink light emitting section 27 and transmitted over the uplink optical fiber 3b, converts the received optical signal into an electric signal, and outputs the electric signal. In this case, the radio band signal received by the antenna 26 is demodulated so as to obtain the baseband signal by the radio demodulation section 28. Thus, a reception signal 84 obtained by demodulating the radio band reception signal is output from the uplink light receiving section 13.

As described above, a feature of the radio communication system according to the present embodiment is to use baseband optical communications in the uplink system in place of the ROF technique. As such, even if the baseband optical communications are used in the uplink system, it is possible to produce the same effect as the first embodiment by utilizing the advantage of the optical transmission device 5.

Note that the optical transmission device and the radio communication system according to the first and second embodiments may be structured as follows. First, in the uplink system, an arbitrary communication method may be used in place of the ROF technique or the baseband optical communications. The use of the above-described optical transmission device 5 in the downlink system allows the same effect as the above-described embodiments to be produced irrespective of the communication method in the uplink system. Also, the optical transmission device 5 may be used in an optical transmission system other than the radio communication system (for example, an optical transmission network system interconnecting a multi-staged optical fibers). Also in this case, it is possible to produce the same effect as the above-described embodiments.

Furthermore, the transmission timing signal reconstruction section may be united with a component connected to a following stage of the high frequency amplification section (for example, the antenna switch). Also, the variable light emitting section may control an intensity of an optical signal to be output by causing the optical signal modulated based on the radio transmission signal to pass through an optical switch circuit controlled by the transmission timing signal. Still further, the light emitting section may perform frequency modulation or phase modulation in place of intensity modulation. In the case where the light emitting section performs frequency modulation or phase modulation, it is possible to produce the same effect as the above-described embodiments by controlling an intensity of the optical signal based on the transmission timing signal before or after performing the frequency modulation or the phase modulation.

(Third Embodiment)

Figure 8:
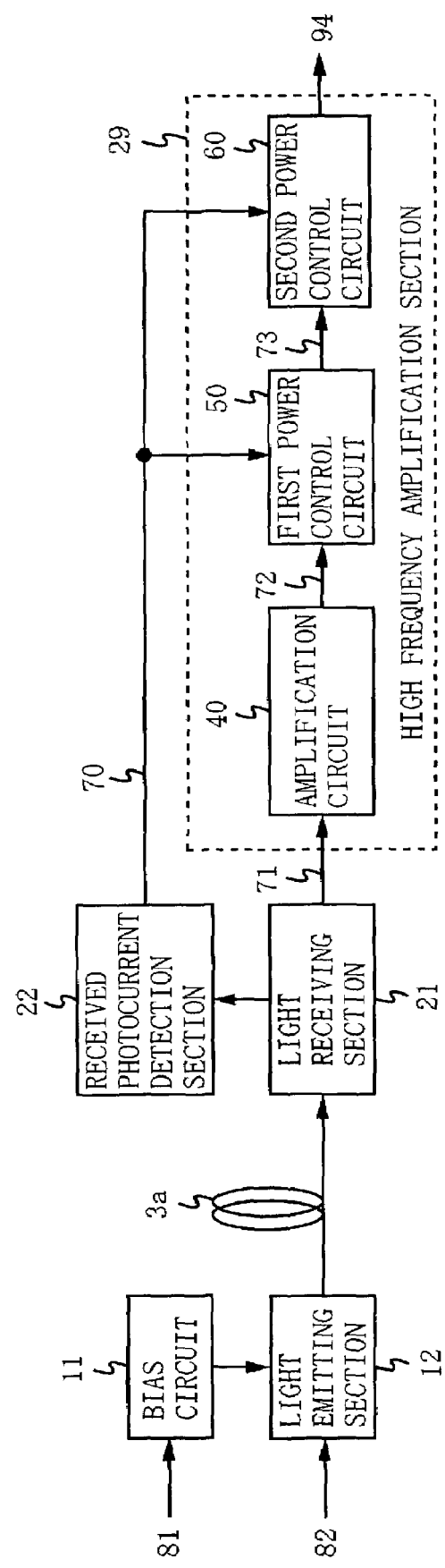
FIG. 8 is a block diagram showing the structure of an optical transmission device according to a third embodiment of the present invention.

FIG. 8 is a block diagram showing the structure of an optical transmission device according to a third embodiment of the present invention. As is the case with the optical transmission device according to the first embodiment, the optical transmission device shown in FIG. 8 is used as a downlink system of the radio communication system. The above-described optical transmission device includes the bias circuit 11, the light emitting section 12, the light receiving section 21, the received photocurrent detection section 22, a high frequency amplification section 29, and the downlink optical fiber 3a. The optical transmission device of the third embodiment differs from optical transmission device of the first embodiment only in that the high frequency amplification section 29 is included in place of a high frequency amplification section 23. Any components of the third embodiment that function in similar manners to their counterparts of the first embodiment are denoted by like numerals, with the descriptions thereof omitted. Note that the optical transmission device may include a transmission timing signal reconstruction section for reconstructing the transmission timing signal based on an intensity of an received optical signal.

The high frequency amplification section 29 amplifies a radio transmission signal 71 output from the light receiving section 21 so as to obtain a signal having predetermined power by controlling an amplification factor based on a received photocurrent detection signal 70 output from the received photocurrent detection section 22. The high frequency amplification section 29 includes an amplification circuit 40, a first power control circuit 50, and a second power control circuit 60. The amplification circuit 40 amplifies the radio transmission signal 71 by a predetermined amplification factor, and outputs the amplified signal as a radio transmission signal 72. The first power control circuit 50 performs automatic power control for the radio transmission signal 72, and outputs the power controlled signal as a radio transmission signal 73. The second power control circuit 60 performs further automatic power control for the radio transmission signal 73, and outputs the power controlled signal as a radio transmission signal 94. The radio transmission signal 94 is supplied to an antenna switch (not shown) connected to a following stage of the optical transmission device.

The automatic power control in the first power control circuit 50 is performed for accommodating a change in power of the radio transmission signal 94, the change caused by a change in optical power. The automatic power control in the second power control circuit 60 is performed for accommodating a change in power of the radio transmission signal 94, the change caused by other than a change in optical power. More specifically, the first power control circuit 50 attenuates the radio transmission signal 72 so as to keep the power of the radio transmission signal 94 substantially constant even if a voltage level of the received photocurrent detection signal 70 is changed. The second power control circuit 60 performs feedback control, and attenuates the radio transmission signal 73 so as to bring the power of the radio transmission signal 94 to a pre-set value. Note that the power of the radio transmission signal 94 may be changed by other than a change in optical power, for example, by a change in an amplification factor of the amplification circuit 40, which is caused by a change in a temperature.

Figure 9:
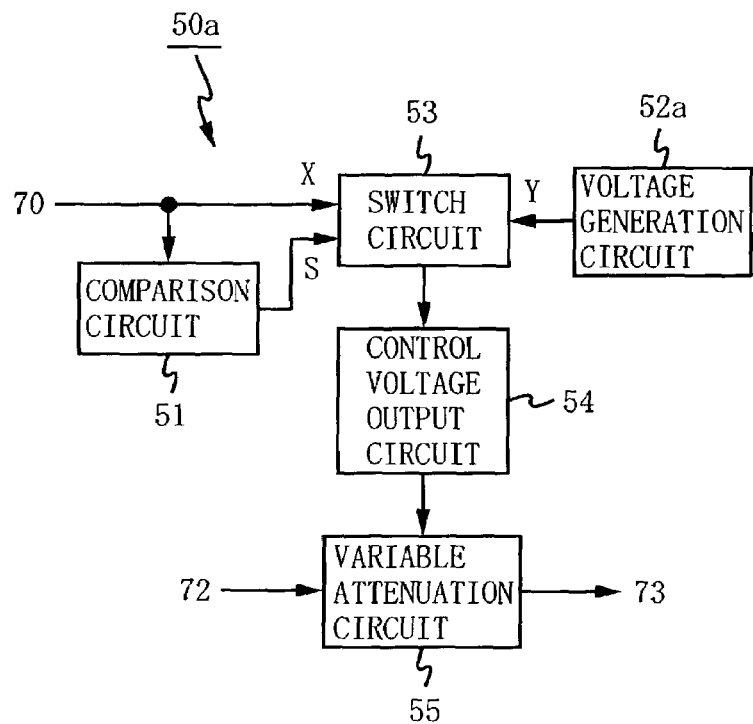
FIG. 9 is a block diagram showing the detailed structure of a first power control circuit included in the optical transmission device according to the third embodiment of the present invention.

FIG. 9 is a block diagram showing the detailed structure of the first power control circuit 50. A first power control circuit 50a shown in FIG. 9 includes a comparison circuit 51, a voltage generation circuit 52a, a switch circuit 53, a control voltage output circuit 54, and a variable attenuation circuit 55. The comparison circuit 51 determines whether or not an intensity of the optical signal received by the light receiving section 21 is greater than a predetermined value. More specifically, the comparison circuit 51 has a predetermined threshold value T3 with respect to a light intensity, and outputs a signal indicating whether or not a voltage level of the received photocurrent detection signal 70 exceeds the threshold value T3, as a control signal for the switch circuit 53. When the voltage level of the received photocurrent detection signal 70 exceeds the threshold value T3, the value of the above-described control signal is 1, which indicates a transmission state. On the other hand, when the voltage level of the received photocurrent detection signal 70 is equal to or smaller than the threshold value T3, the value of the above-described control signal is 0, which indicates a non-transmission state.

The voltage generation circuit 52a fixedly generates a predetermined voltage Vc which is substantially equal to a voltage corresponding to a light intensity to be detected by the received photocurrent detection section 22 in the transmission state (that is, an expected value of the light intensity in the transmission state). More specifically, the voltage generation circuit 52a generates the voltage Vc which is substantially equal to a voltage level of the received photocurrent detection signal 70, the voltage level to be detected when the radio transmission signal 82 is input into the optical transmission device.

Based on the output signal of the comparison circuit 51, the switch circuit 53 selects either the received photocurrent detection signal 70 or the output signal of the voltage generation circuit 52a, and outputs the selected signal. More specifically, when the value of the output signal of the comparison circuit 51 is 1 (transmission state), the switch circuit 53 selects the received photocurrent detection signal 70. On the other hand, when the value of the output signal of the comparison circuit 51 is 0 (non-transmission state), the switch circuit 53 selects the output signal of the voltage generation circuit 52a.

Based on the output signal of the switch circuit 53, the control voltage output circuit 54 obtains a control voltage to be supplied to the variable attenuation circuit 55. The variable attenuation circuit 55 is an attenuation circuit which can control its attenuation factor. The variable attenuation circuit 55 attenuates the radio transmission signal 72 by an attenuation factor corresponding to the control voltage output from the control voltage output circuit 54, and outputs the attenuated signal as the radio transmission signal 73.

Figure 10:
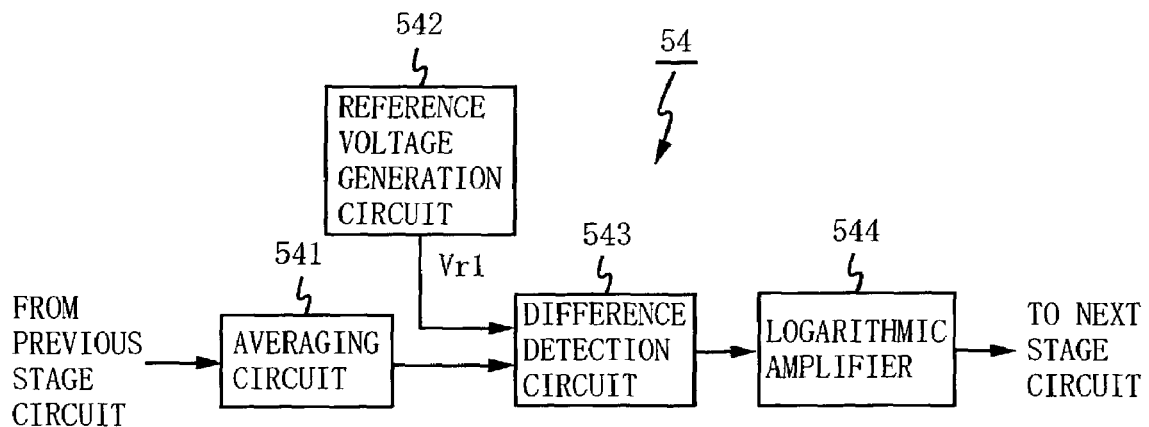
FIG. 10 is a block diagram showing the detailed structure of a control voltage output circuit included in the first power control circuit of the optical transmission device according to the third embodiment of the present invention.

FIG. 10 is a block diagram showing the detailed structure of the control voltage output circuit 54. The control voltage output circuit 54 includes an averaging circuit 541, a reference voltage generation circuit 542, a difference detection circuit 543, and a logarithmic amplifier 544. The averaging circuit 541 obtains a moving average of a voltage level of the output signal of the previous stage circuit (in FIG. 9, the switch circuit 53). The reference voltage generation circuit 542 fixedly generates a reference voltage Vr1 which is a reference for a voltage level of the output signal of the previous stage circuit. The difference detection circuit 543 obtains a difference between the moving average value obtained by the averaging circuit 541 and the reference voltage Vr1. The logarithmic amplifier 544 applies a logarithmic transformation to the voltage difference obtained by the difference detection circuit 543, and outputs the log-transformed voltage to a circuit (in FIG. 9, the variable attenuation circuit 55) connected to a following stage of the control voltage output circuit 54. As such, a logarithmic value of the voltage difference is supplied to the variable attenuation circuit 55 as a control voltage, thereby controlling the amount of attenuation in the variable attenuation circuit 55 in proportion to optical power. Thus, it is possible to perform automatic power control with high precision.

Figure 11:
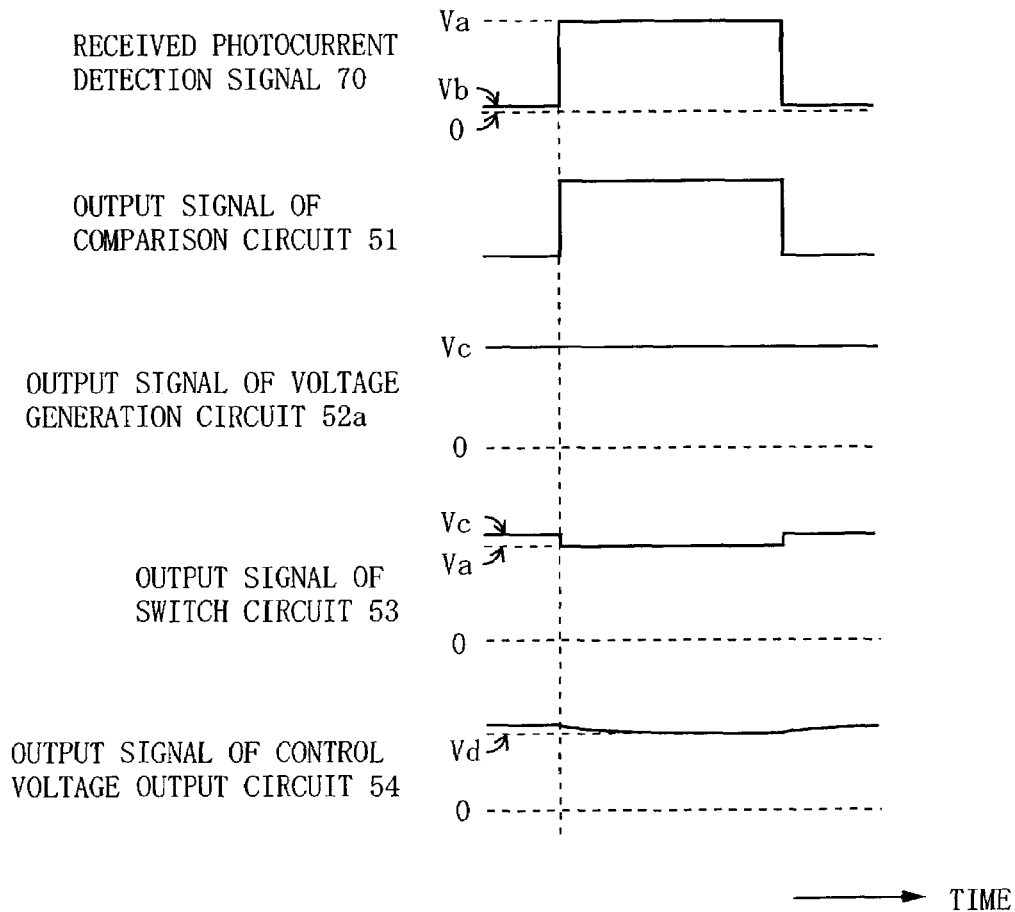
FIG. 11 is a signal waveform diagram for describing an operation of the first power control circuit included in the optical transmission device according to the third embodiment of the present invention.

With reference to a signal waveform diagram shown in FIG. 11, an operation of the first power control circuit 50a will be described. A voltage level of the received photocurrent detection signal 70 (a signal in the first line of FIG. 11) is assumed to be a first voltage Va in a transmission state of the radio transmission signal 82, and the voltage level thereof is assumed to be a second voltage Vb which is substantially equal to zero in a non-transmission state of the radio transmission signal 82. A value smaller than the first voltage Va and greater than the second voltage Vb is used as the threshold value T3 of the comparison circuit 51. As a result, in the transmission state, the value of the output signal of the comparison circuit 51 (a signal in the second line of FIG. 11) is 1, and the above-described value is 0 in the non-transmission state. A voltage level of the output signal of the voltage generation circuit 52a (a signal in the third line of FIG. 11) is constant at the voltage Vc.

A voltage level of the output signal of the switch circuit 53 (a signal in the fourth line of FIG. 11) is the voltage Va in the transmission state of the radio transmission signal 82. On the other hand, the above-described voltage level is the voltage Vc in the non-transmission state of the radio transmission signal 82. The output signal of the control voltage output circuit 54 (a signal in the bottom line of FIG. 11) is changed with a change in the output signal of the switch circuit 53. Here, the voltage Vc is determined so as to be substantially equal to the voltage Va, whereby a voltage level of the output signal of the control voltage output circuit 54 is a voltage Vd, which is substantially constant. Also, calculation of a moving average and a logarithmic transformation are performed in the control voltage output circuit 54. Thus, the output signal of the control voltage output circuit 54 is changed slowly over a certain amount of time even if the output signal of the switch circuit 53 is changed instantaneously between the voltages Va and Vc.

As described above, the first voltage control circuit 50 fixedly generates the voltage Vc which is substantially equal to the voltage level of the received photocurrent detection signal 70 in the transmission state, and attenuates the radio transmission signal 72 by an attenuation factor corresponding to the voltage level of the received photocurrent detection signal 70 in the transmission state, or by an attenuation factor corresponding to the voltage Vc in the non-transmission state. Thus, in the transmission state, the use of the first voltage control circuit 50 allows a change in the power of the radio transmission signal 94, which is caused by a change in the optical power, to be accommodated. Also, in the non-transmission state, the use of the first voltage control circuit 50 allows the power of the radio transmission signal 94 to be controlled at substantially the same level as that in the transmission state.

Figure 12:
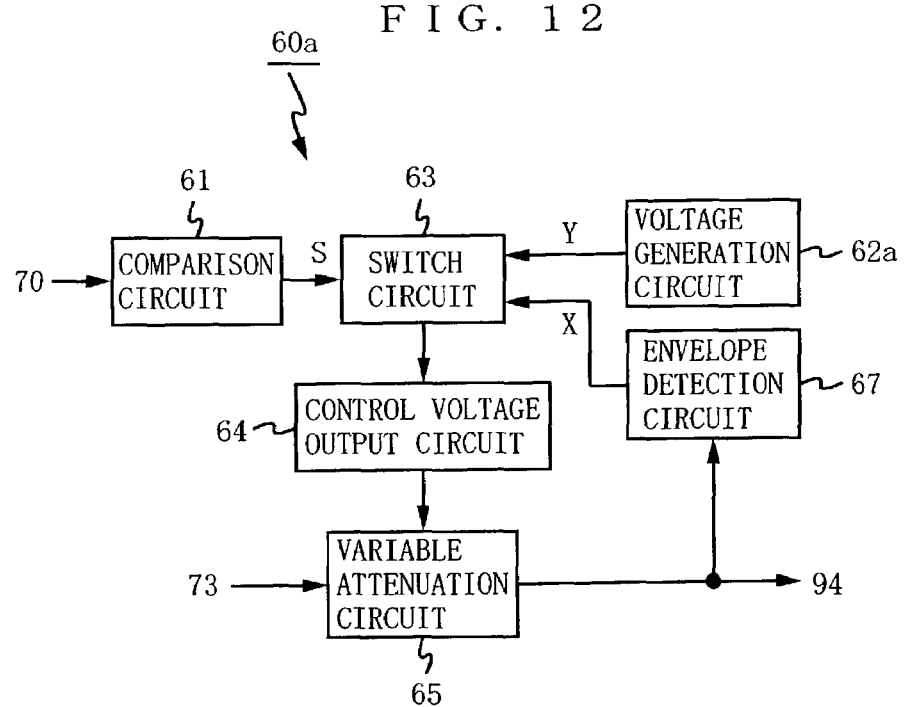
FIG. 12 is a block diagram showing the detailed structure of a second power control circuit included in the optical transmission device according to the third embodiment of the present invention.

FIG. 12 is a block diagram showing the detailed structure of the second power control circuit 60. A second power control circuit 60a shown in FIG. 12 includes a comparison circuit 61, a voltage generation circuit 62a, a switch circuit 63, a control voltage output circuit 64, a variable attenuation circuit 65, and an envelope detection circuit 67. The second power control circuit 60a differs from the first power control circuit 50a in that the envelope detection circuit 67 is additionally included and feedback control is performed. However, the principle of operation of the second power control circuit 60a is substantially equal to that of the first power control circuit 50a.

The envelope detection circuit 67 performs envelope detection for the radio transmission signal 94 output from the variable attenuation circuit 65, and outputs a signal having a voltage corresponding to the power of the radio transmission signal 94. The voltage generation circuit 62a fixedly generates a predetermined voltage Vf which is substantially equal to the voltage corresponding to the power to be obtained by the envelope detection circuit 67 in the transmission state (that is, an expected value of the power of the radio transmission signal 94 in the transmission state). More specifically, the voltage generation circuit 62a generates the voltage Vf which is substantially equal to a voltage level of the output signal of the envelope detection circuit 67, the voltage level to be detected when the radio transmission signal 82 is input into the optical transmission device.

The comparison circuit 61, the switch circuit 63, the control voltage output circuit 64, and the variable attenuation circuit 65 operate in similar manners to their counterparts included in the first power control circuit 50a. That is, the comparison circuit 61 outputs a signal indicating whether or not a voltage level of the received photocurrent detection signal 70 exceeds a threshold value T4, as a control signal for the switch circuit 63. When a value of the output signal of the comparison circuit 61 is 1 (transmission state), the switch circuit 63 selects the output signal of the envelope detection circuit 67. Otherwise, the switch circuit 63 selects the output signal of the voltage generation circuit 62a. Based on the output signal of the switch circuit 63, the control voltage output circuit 64 obtains a control signal to be supplied to the variable attenuation circuit 65. The variable attenuation circuit 65 attenuates the radio transmission signal 73 by an attenuation factor corresponding to the control voltage output from the control voltage output circuit 64, and outputs the attenuated signal as the radio transmission signal 94. Note that the above-described threshold value T4 typically coincides with the threshold value T3 of the comparison circuit 51, but the above-described two threshold values are not necessarily required to coincide with each other.

Figure 13:
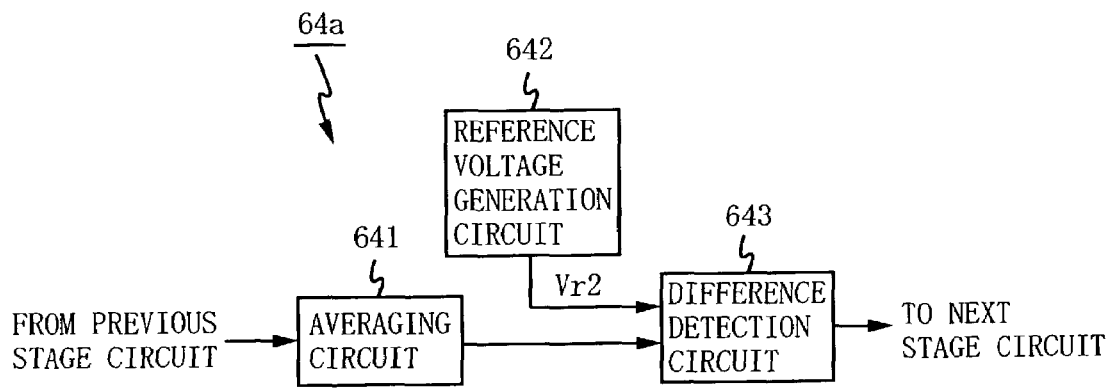
FIG. 13 is a block diagram showing the detailed structure of a control voltage output circuit included in the second power control circuit of the optical transmission device according to the third embodiment of the present invention.
Figure 14:
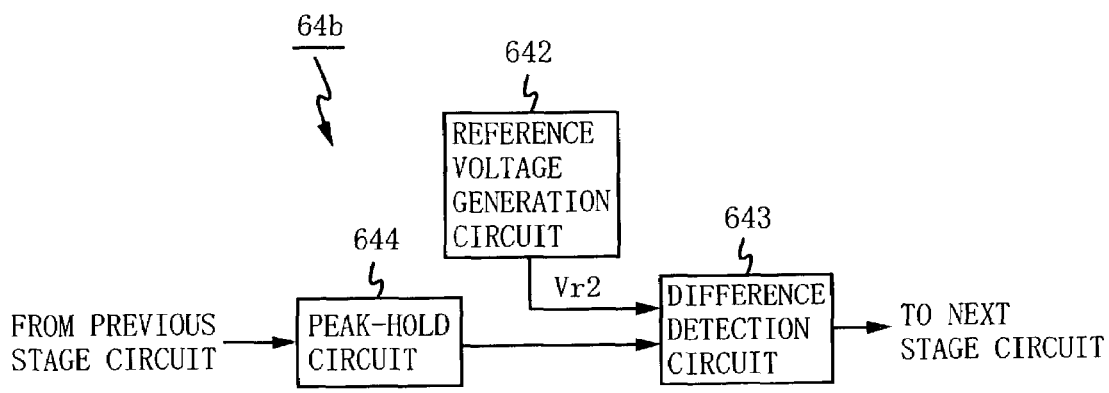
FIG. 14 is a block diagram showing another detailed structure of the control voltage output circuit included in the second power control circuit of the optical transmission device according to the third embodiment of the present invention.
Figure 15:
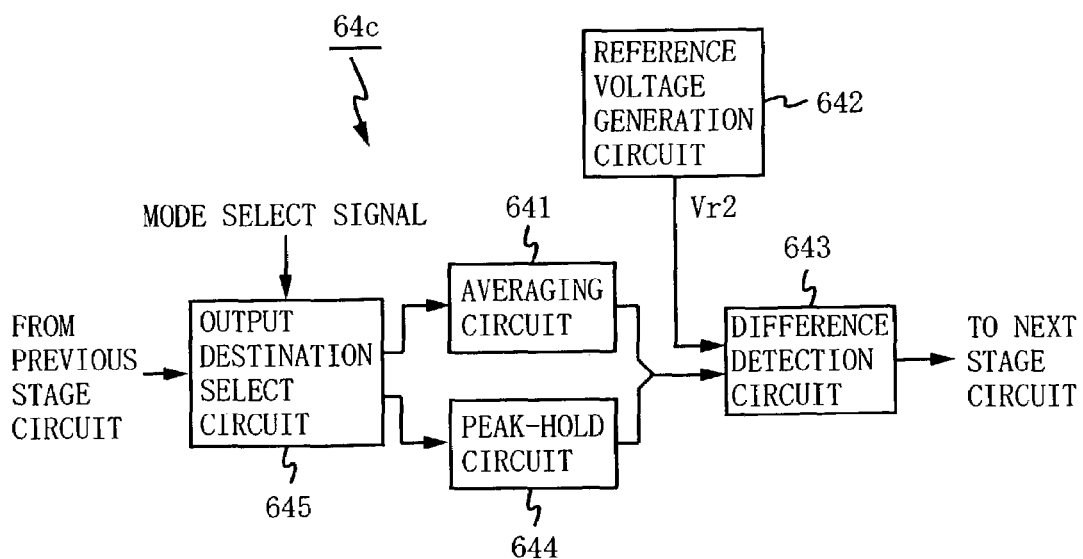
FIG. 15 is a block diagram showing still another detailed structure of the control voltage output circuit included in the second power control circuit of the optical transmission device according to the third embodiment of the present invention.

FIGS. 13 to 15 are block diagrams showing the detailed structure of the control voltage output circuit 64. A control voltage output circuit 64a shown in FIG. 13 includes an averaging circuit 641, a reference voltage generation circuit 642, and a difference detection circuit 643. The averaging circuit 641 obtains a moving average of a voltage level of the output signal of the previous stage circuit (in FIG. 12, the switch circuit 63). The reference voltage generation circuit 642 fixedly generates a reference voltage Vr2 which is a reference for a voltage level of the output signal of the previous stage circuit. The difference detection circuit 643 obtains a difference between the moving average value obtained by the averaging circuit 641 and the reference voltage Vr2, and outputs the obtained voltage difference to a circuit (in FIG. 12, the variable attenuation circuit 65) connected to a following stage of the control voltage output circuit 64. As such, the control voltage output circuit 64a supplies an average value of the voltage difference to the variable attenuation circuit 65 as a control voltage. Thus, the use of the control voltage output circuit 64a allows a signal, for which automatic power control cannot be performed based on a peak value due to uncertainty in a peak level (for example, a CDMA signal), to be subjected to automatic power control.

In a control voltage output circuit 64b shown in FIG. 14, the averaging circuit 641 of the control voltage output circuit 64a is replaced with a peak-hold circuit 644. The peak-hold circuit 644 holds a peak value of the output signal of the previous stage circuit (in FIG. 12, the switch circuit 63). As such, the control voltage output circuit 64b supplies the peak value of the voltage difference to the variable attenuation circuit 65 as a control voltage. Thus, the use of the control voltage output circuit 64b allows a signal, whose duty ratio varies depending on a bit pattern of data to be transmitted (for example, an ASK signal), to be subjected to automatic power control.

A control voltage output circuit 64c shown in FIG. 15 differs from the control voltage output circuit 64b shown in FIG. 14 in that the averaging circuit 641 and an output destination select circuit 645 are additionally included. In accordance with a mode select signal, the output destination select circuit 645 outputs the output signal of the previous stage circuit (in FIG. 12, the switch circuit 63) to either the averaging circuit 641 or the peak-hold circuit 644. As a result, in accordance with the mode select signal, the control voltage output circuit 64c operates in a manner identical to either the control voltage output circuit 64a or the control voltage output circuit 64b. Thus, the use of the control voltage output circuit 64c allows a selection to be made in accordance with the mode select signal whether automatic power control is performed based on an average value of the output signal of the previous stage circuit or based on a peak value of the above-described signal, whereby it is possible to perform automatic power control for various types of radio transmission signals.

Note that, in the above descriptions, the control voltage output circuit 64c causes either the averaging circuit 641 or the peak-hold circuit 644 to function effectively by switching an output destination of the output signal of the previous stage circuit in accordance with the mode select signal. However, the control voltage output circuit 64c may cause either one of the above-described circuits to function effectively by selecting either the output signal of the averaging circuit 641 or the output signal of the peak-hold circuit 644.

Figure 16:
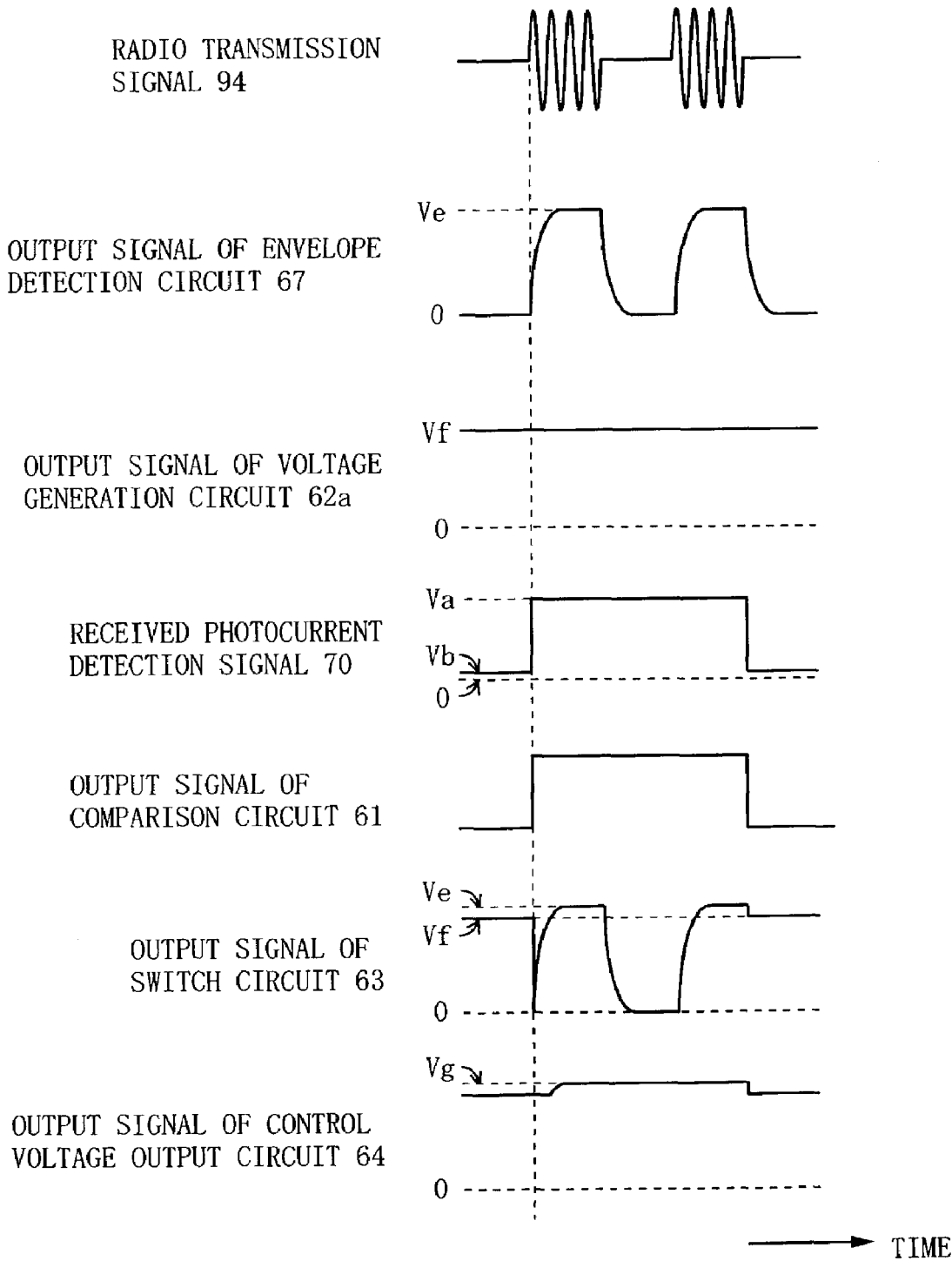
FIG. 16 is a signal waveform diagram for describing an operation of the second power control circuit included in the optical transmission device according to the third embodiment of the present invention.

With reference to a signal waveform diagram shown in FIG. 16, an operation of the second power control circuit 60a including the control voltage output circuit 64b will be described. A voltage level of the received photocurrent detection signal 70 (a signal in the fourth line of FIG. 16) is assumed to be the first voltage Va in the transmission state of the radio transmission signal 82. In the non-transmission state of the radio transmission signal 82, however, the above-described voltage level is assumed to be the second voltage Vb which is substantially equal to zero. Also, a peak value of a voltage level of the output signal of the envelope detection circuit 67 (a signal in the second line of FIG. 16) is assumed to be a voltage Ve. A value smaller than the first voltage Va and greater than the second voltage Vb is used as the threshold value T4 of the comparison circuit 61. Thus, a value of the output signal of the comparison circuit 61 (a signal in the fifth line of FIG. 16) is 1 in the transmission state of the radio transmission signal 82, and the above-described value is 0 in the non-transmission state of the radio transmission signal 82. A voltage level of the output signal of the voltage generation circuit 62a (a signal in the third line of FIG. 16) is constant at the voltage Vf.

A voltage level of the output signal of the switch circuit 63 (a signal in the sixth line of FIG. 16) is the voltage Ve at the maximum in the transmission state of the radio transmission state 82. In the non-transmission state of the radio transmission signal 82, however, the above-described level is the voltage Vf. The output signal of the control voltage output circuit 64 (a signal in the bottom line of FIG. 11) is changed with a change in the output signal of the switch circuit 63. Here, due to the peak-hold circuit 644 included in the control voltage output circuit 64b, a voltage level of the output signal of the control voltage output circuit 64 is the voltage Ve during most of the time period when the radio transmission signal is transmitted. Also, the voltage Vf is determined so as to be substantially equal to the voltage Ve, whereby a voltage level of the output signal of the control voltage output circuit 64 is a substantially constant voltage Vg.

As such, the second power control circuit 60 fixedly generates the voltage Vf which is substantially equal to a voltage level of the output signal of the envelope detection circuit 67 in the transmission state, and attenuates the radio transmission signal 73 by an attenuation factor corresponding to the voltage level of the output signal of the envelope detection circuit 67 in the transmission state, or by a factor corresponding to the voltage Vf in the non-transmission state. As a result, in the transmission state, the use of the second power control circuit 60 allows the power of the radio transmission signal 94 to be controlled so as to be closer to a pre-set value. Also, in the non-transmission state, the use of the second power control circuit 60 allows the power of the radio transmission signal 94 to be controlled at substantially the same level as that in the transmission state. Thus, according to the second power control circuit 60, it is possible to accommodate a change in the power of the radio transmission signal 94, the change caused by other than a change in the optical power.

As described above, according to the optical transmission device of the present embodiment, the center station outputs an optical signal having an intensity corresponding to the transmission timing signal and modulated based on the radio band transmission signal. The antenna side base station determines whether it is in the transmission state or the non-transmission state based on an intensity of the received optical signal, and performs automatic power control for outputting, even in the non-transmission state, a signal whose power is substantially equal to that of a signal in the transmission state. As such, the antenna side base station can determine a transmission timing based on a light intensity and perform automatic power control even if the transmission signal is not received. Thus, it is possible to provide an optical transmission device including an automatic power control circuit (APC circuit) for a burst radio signal, the optical transmission device having a simple structure and capable of being realized at low cost. Also, automatic power control is divided into a first stage for accommodating a change in power of the radio transmission signal, the change caused by a change in optical power, and a second stage for accommodating a change in power of the radio transmission signal, the change caused by other than a change in optical power, whereby it is possible to narrow a dynamic range of an input signal in the second stage automatic power control. Thus, automatic power control can be performed by a simple structure without using a high-performance variable amplification circuit or variable attenuation circuit.

Figure 17:
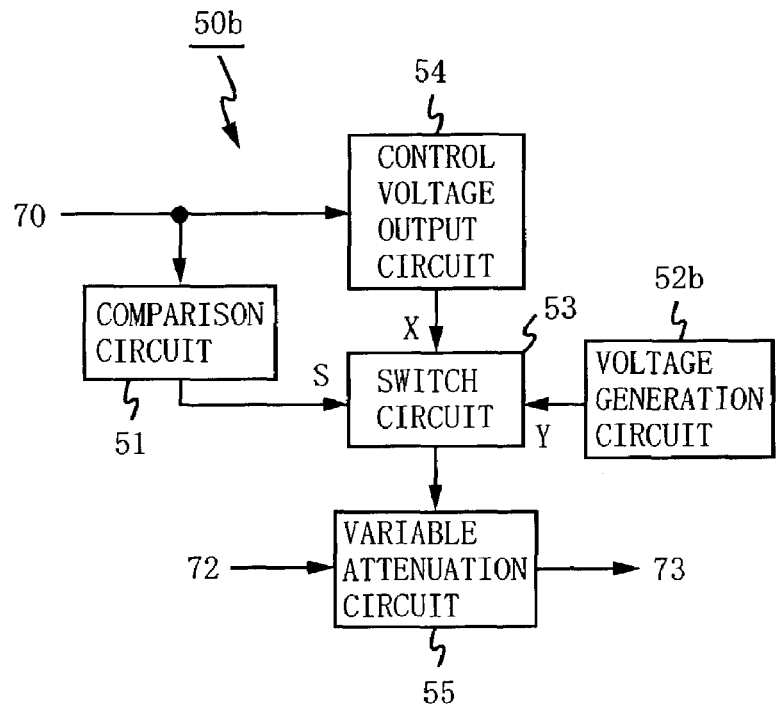
FIG. 17 is a block diagram showing another detailed structure of the first power control circuit included in the optical transmission device according to the third embodiment of the present invention.
Figure 18:
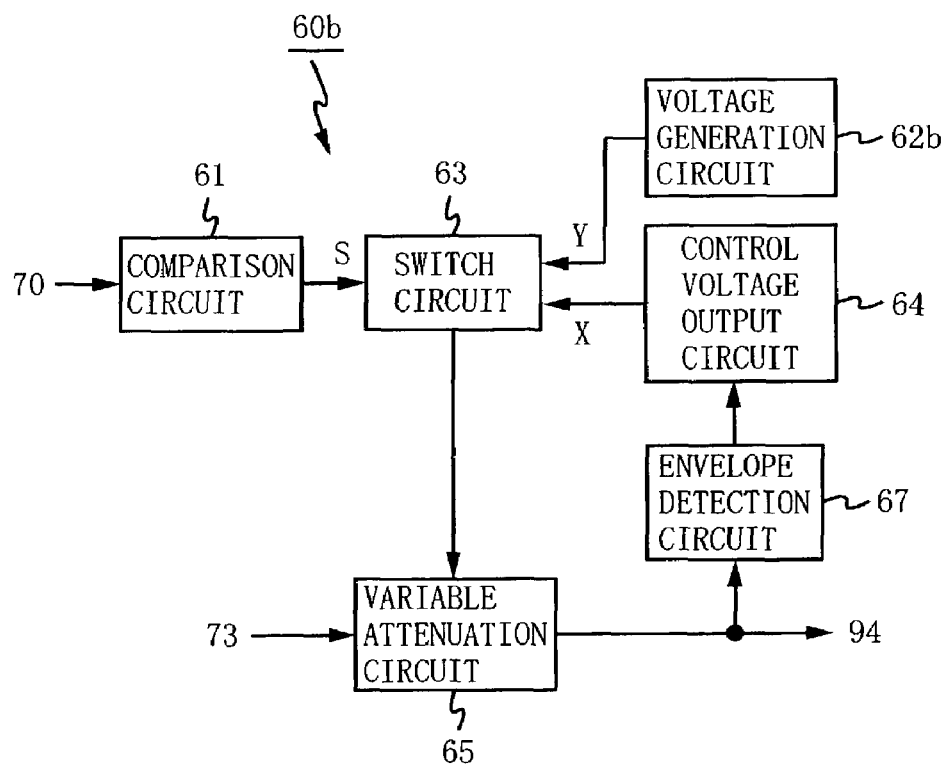
FIG. 18 is a block diagram showing another detailed structure of the second power control circuit included in the optical transmission device according to the third embodiment of the present invention.

Note that the structures of the first power control circuit 50 and the second power control circuit 60 are not limited to those described above. For example, the first power control circuit 50 may have the structure shown in FIG. 17, and the second power control circuit 60 may have the structure shown in FIG. 18. A first power control circuit 50b shown in FIG. 17 differs from the aforementioned first power control circuit 50a (FIG. 9) in a connection order of the switch circuit 53 and the control voltage output circuit 54 and a level of a voltage generated by a voltage generation circuit 52b. The voltage generation circuit 52b fixedly generates a voltage which is substantially equal to a voltage of the output signal of the control voltage output circuit 54 in the transmission state. A second power control circuit 60b shown in FIG. 18 differs from the aforementioned second power control circuit 60a (FIG. 12) in a connection order of the switch circuit 63 and the control voltage output circuit 64 and a level of a voltage generated by a voltage generation circuit 62b. The voltage generation circuit 62b fixedly generates a voltage which is substantially equal to a voltage of the output signal of the control voltage output circuit 64 in the transmission state. Operations and functions of the first power control circuit 50b and the second power control circuit 60b structured as described above can be easily derived from the above descriptions. Thus, the descriptions thereof are omitted.

(Fourth Embodiment)

As is the case with the optical transmission device according to the third embodiment, an optical transmission device according to a fourth embodiment of the present invention has the structure shown in FIG. 8. The optical transmission device of the fourth embodiment differs from that of the third embodiment only in the detailed structures of the first power control circuit 50 and the second power control circuit 60. Thus, in the following descriptions, only the detailed structures of the first power control circuit 50 and the second power control circuit 60 will be described. Any components of the fourth embodiment that function in similar manners to their counterparts of the third embodiment are denoted by like numerals, with the descriptions thereof omitted.

Figure 19:
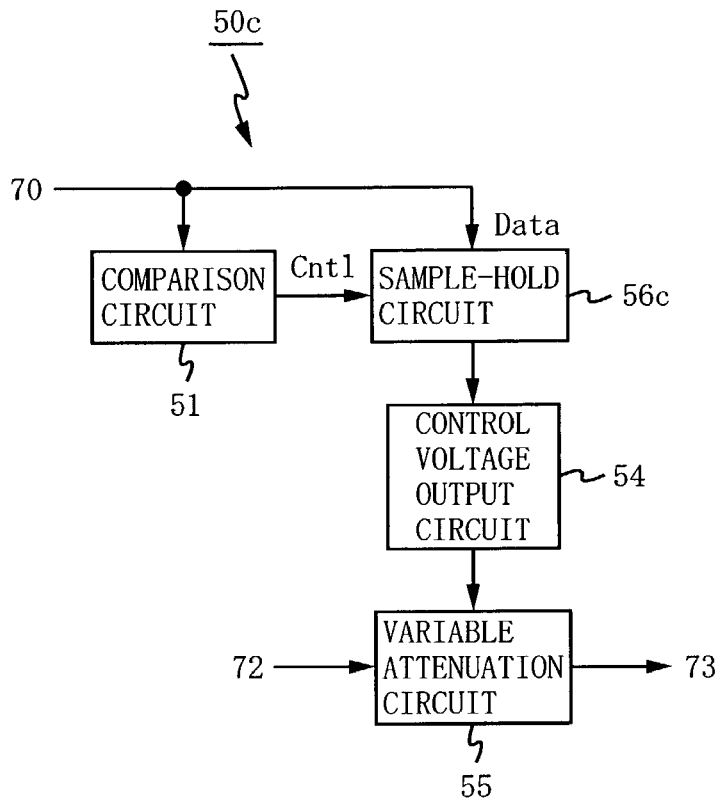
FIG. 19 is a block diagram showing the detailed structure of a first power control circuit included in an optical transmission device according to a fourth embodiment of the present invention.

FIG. 19 is a block diagram showing the detailed structure of the first power control circuit 50 according to the present embodiment. A first power control circuit 50c shown in FIG. 19 includes the comparison circuit 51, a sample-hold circuit 56c, the control voltage output circuit 54, and the variable attenuation circuit 55. The above-described components other than the sample-hold circuit 56c are equal to their counterparts included in the first power control circuit 50a (FIG. 9).

Based on the output signal of the comparison circuit 51, the sample-hold circuit 56c samples the received photocurrent detection signal 70 and holds the sampled signal. More specifically, during a time period when a value of the output signal of the comparison circuit 51 is 1 (transmission state), the sample-hold circuit 56c outputs a voltage of the received photocurrent detection signal 70 (that is, a voltage corresponding to an actual measured value of the light intensity in the transmission state) as it is. When the value of the output signal of the comparison circuit 51 is changed from 1 (transmission state) to 0 (non-transmission state), the sample-hold circuit 56c samples the voltage of the received photocurrent detection signal 70, holds the sampled voltage, and outputs the held voltage during a time period when the value of the output signal of the comparison circuit 51 is 0 (non-transmission state).

Figure 20:
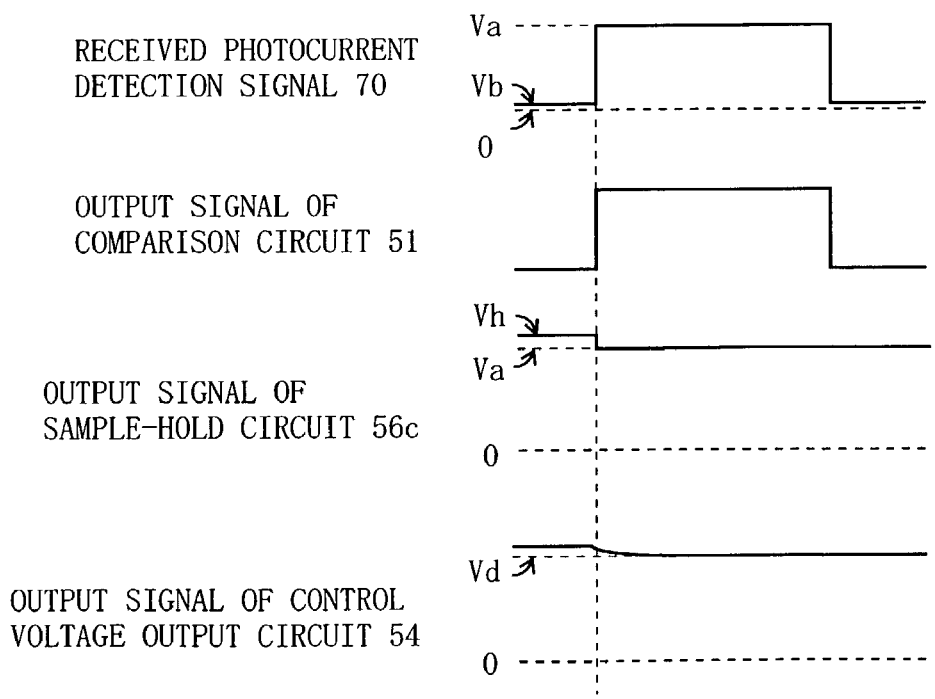
FIG. 20 is a signal waveform diagram for describing an operation of the first power control circuit included in the optical transmission device according to the fourth embodiment of the present invention.

As aforementioned, the voltage generation circuit 52a according to the third embodiment fixedly generates the predetermined voltage Vc which is substantially equal to a voltage corresponding to an expected value of the light intensity in the transmission state. On the other hand, the sample-hold circuit 56c according to the present embodiment outputs, in the non-transmission state, a voltage corresponding to an actual measured value of the light intensity in the previous transmission state. As such, what the sample-hold circuit 56c and the voltage generation circuit 52a have common is to output, in the non-transmission state, a voltage whose level is substantially equal to that of a voltage in the transmission state. Also, as is the case with the switch circuit 53 according to the third embodiment, the sample-hold circuit 56c selects either the voltage of the received photocurrent detection signal 70 or the held voltage based on the output signal of the comparison circuit 51, and outputs the selected voltage. Thus, the first power control circuit 50c operates in a manner similar to the first power control circuit 50a, and produces the same effect as the first power control circuit 50a. Note that FIG. 20 is a signal waveform diagram of the first power control circuit 50c, which is illustrated in a manner similar to the signal waveform diagram shown in FIG. 11.

Figure 21:
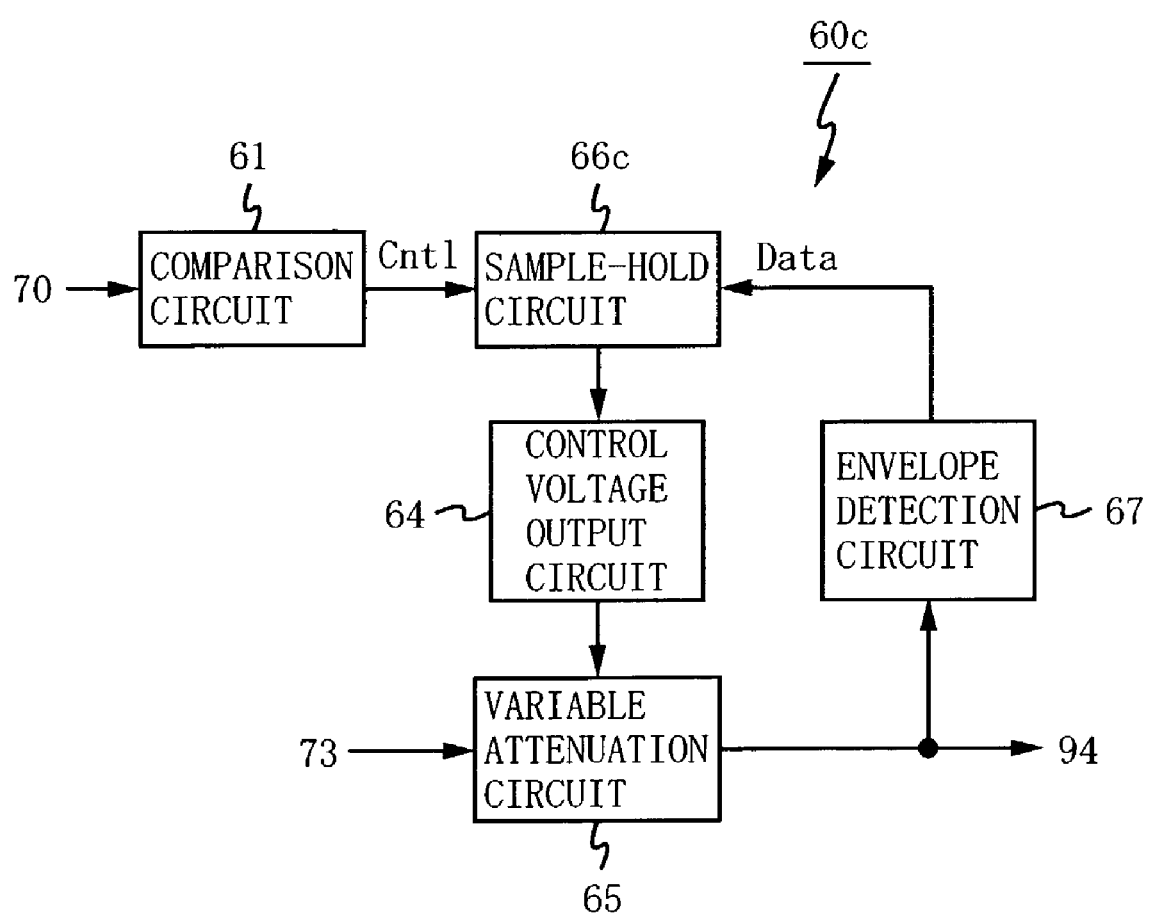
FIG. 21 is a block diagram showing the detailed structure of a second power control circuit included in the optical transmission device according to the fourth embodiment of the present invention.

FIG. 21 is a block diagram showing the detailed structure of the second power control circuit 60 according to the present embodiment. A second power control circuit 60c shown in FIG. 21 includes the comparison circuit 61, a sample-hold circuit 66c, the control voltage output circuit 64, the variable attenuation circuit 65, and the envelope detection circuit 67. The above-described components other than the sample-hold circuit 66c are equal to their counterparts included in the second power control circuit 60a (FIG. 12).

Based on the output signal of the comparison circuit 61, the sample-hold circuit 66c samples the output signal of the envelope detection circuit 67, and holds the sampled signal. More specifically, during a time period when a value of the output signal of the comparison circuit 61 is 1 (transmission state), the sample-hold circuit 66c outputs a voltage of the output signal of the envelope detection circuit 67 (that is, a voltage corresponding to an actual measured value of the power of the radio transmission signal 94 in the transmission state) as it is. When the value of the output signal of the comparison circuit 61 is changed from 1 (transmission state) to 0 (non-transmission state), the sample-hold circuit 66c samples the voltage of the output signal of the envelope detection circuit 67, holds the sampled voltage, and outputs the held voltage during a time period when the value of the output signal of the comparison circuit 61 is 0 (non-transmission state).

Figure 22:
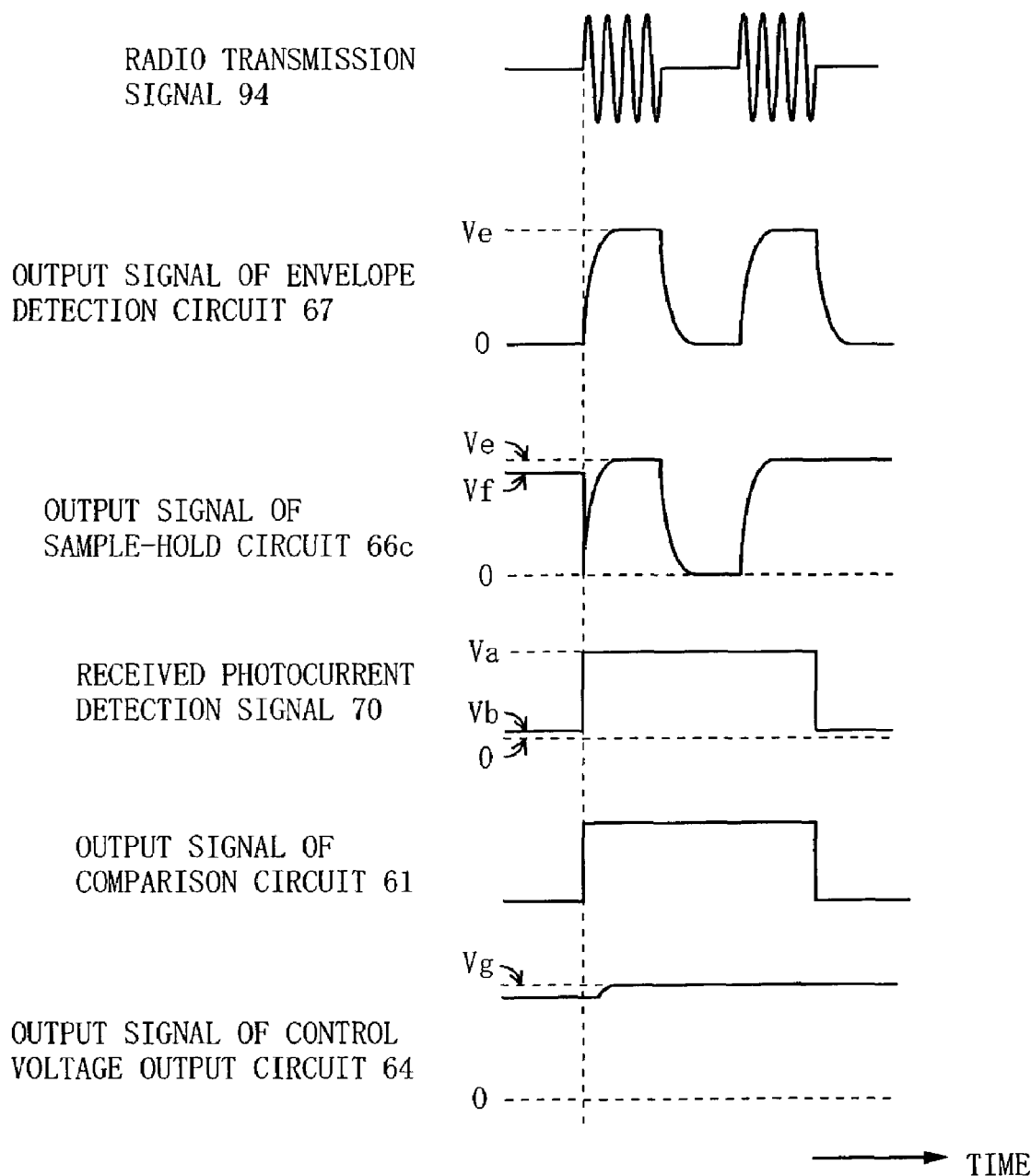
FIG. 22 is a signal waveform diagram for describing an operation of the second power control circuit included in the optical transmission device according to the fourth embodiment of the present invention.

As aforementioned, the voltage generation circuit 62a according to the third embodiment fixedly generates the predetermined voltage Vf which is substantially equal to a voltage corresponding to an expected value of the power of the radio transmission signal 94 in the transmission state. On the other hand, the sample-hold circuit 66c according to the present embodiment outputs, in the non-transmission state, a voltage corresponding to an actual measured value of the radio transmission signal 94 in the previous transmission state. As such, what the sample-hold circuit 66c and the voltage generation circuit 62a have common is to output, in the non-transmission state, a voltage whose level is substantially equal to that of a voltage in the transmission state. Also, as is the case with the switch circuit 63 according to the third embodiment, the sample-hold circuit 66c selects either the voltage of the output signal of the envelope detection circuit 67 or the held voltage based on the output signal of the comparison circuit 61, and outputs the selected voltage. Thus, the second power control circuit 60c operates in a manner similar to the second power control circuit 60a, and produces the same effect as the second power control circuit 60a. Note that FIG. 22 is a signal waveform diagram of the second power control circuit 60c, which is illustrated in a manner similar to the signal waveform diagram shown in FIG. 16.

As described above, the optical transmission device according to the present embodiment includes a sample-hold circuit for holding a voltage of a predetermined signal in the transmission state in place of a voltage generation circuit and a switch circuit. According to the above-described optical transmission device, it is possible to produce the same effect as the third embodiment.

Figure 23:
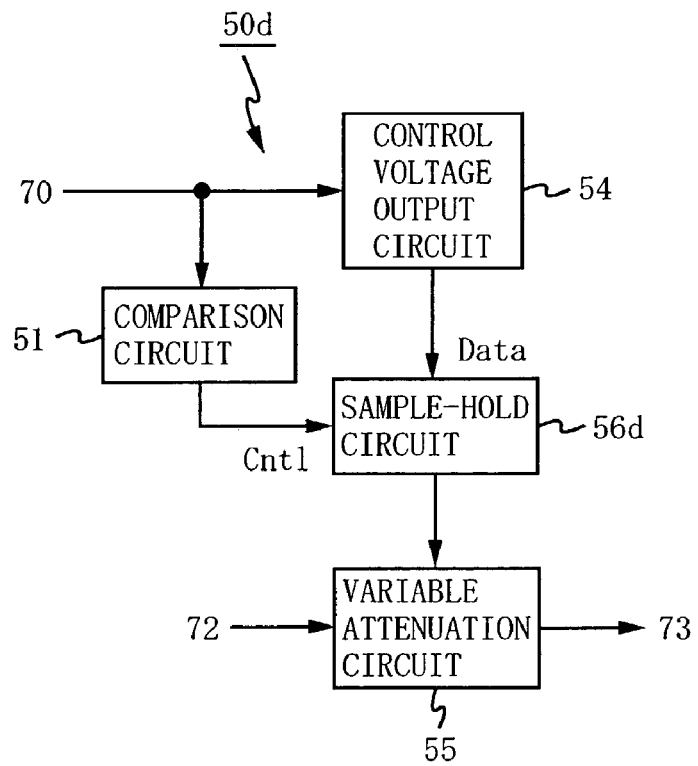
FIG. 23 is a block diagram showing another detailed structure of the first power control circuit included in the optical transmission device according to the fourth embodiment of the present invention.
Figure 24:
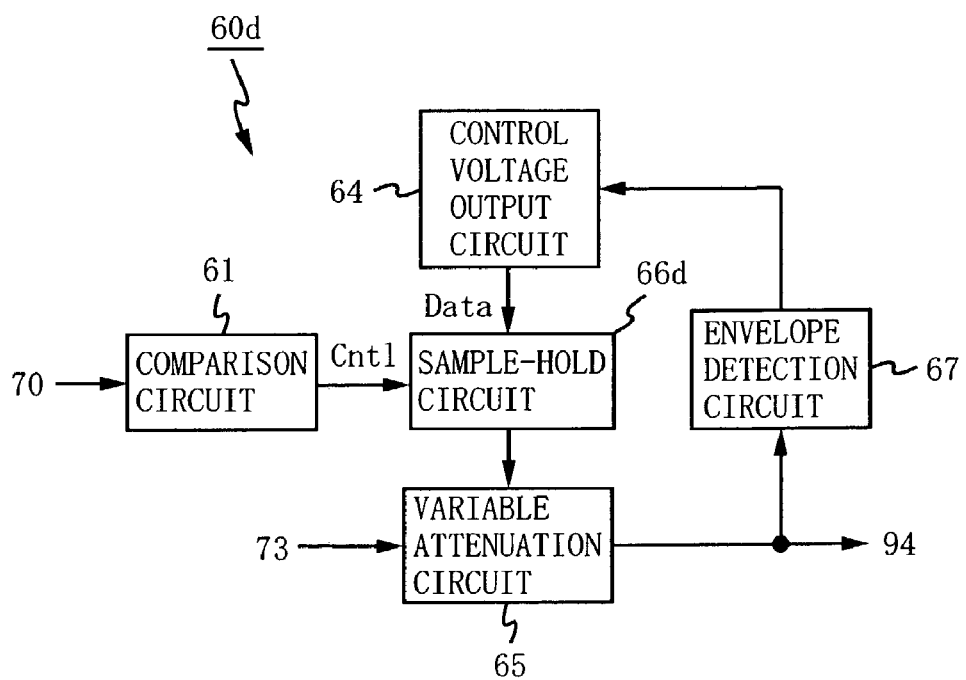
FIG. 24 is a block diagram showing another detailed structure of the second power control circuit included in the optical transmission device according to the fourth embodiment of the present invention.

Note that, also in the present embodiment, the structures of the first power control circuit 50 and the second power control circuit 60 are not limited to those described above. For example, the first power control circuit 50 may have the structure shown in FIG. 23, and the second power control circuit 60 may have the structure shown in FIG. 24. A first power control circuit 50d shown in FIG. 23 differs from the first power control circuit 50c (FIG. 19) in a connection order of a sample-hold circuit 56d and the control voltage output circuit 54 and a voltage held by the sample-hold circuit 56d. The sample-hold circuit 56d holds the output signal of the control voltage output circuit 54 in the transmission state. A second power control circuit 60d shown in FIG. 24 differs from the second power control circuit 60d (FIG. 21) in a connection order of a sample-hold circuit 66d and the control voltage output circuit 64 and a voltage held by the sample-hold circuit 66d. The sample-hold circuit 66d holds the output signal of the control voltage output circuit 64 in the transmission state. Operations and functions of the first power control circuit 50d and the second power control circuit 60d structured as described above can be easily derived from the above descriptions. Thus, the descriptions thereof are omitted.

(Fifth and Sixth Embodiments)

Figure 25:
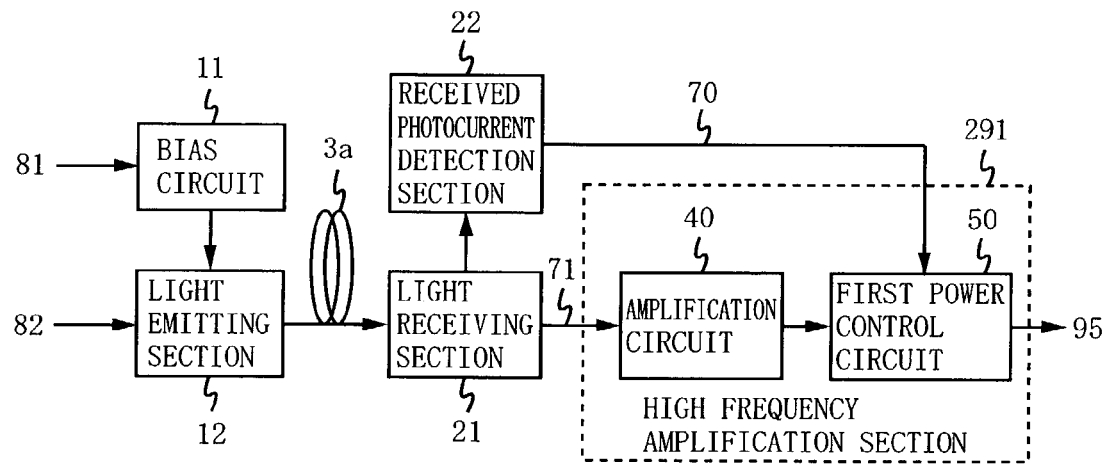
FIG. 25 is a block diagram showing the structure of an optical transmission device according to a fifth embodiment of the present invention.

FIG. 25 is a block diagram showing the structure of an optical transmission device according to a fifth embodiment of the present invention. A high frequency amplification section 291 included in the above-described optical transmission device includes the amplification circuit 40 and the first power control circuit 50, but does not include a second power control circuit. The amplification circuit 40 amplifies the radio transmission signal 71 by a predetermined amplification factor. The first power control circuit 50 performs automatic power control for the output signal of the amplification circuit 40, and outputs the power controlled signal as a radio transmission signal 95. The automatic power control in the first power control circuit 50 is performed for accommodating a change in power of the radio transmission signal 95, the change caused by a change in optical power. The first power control circuit 50 has the arbitrary structure described in the third and fourth embodiments.

Figure 26:
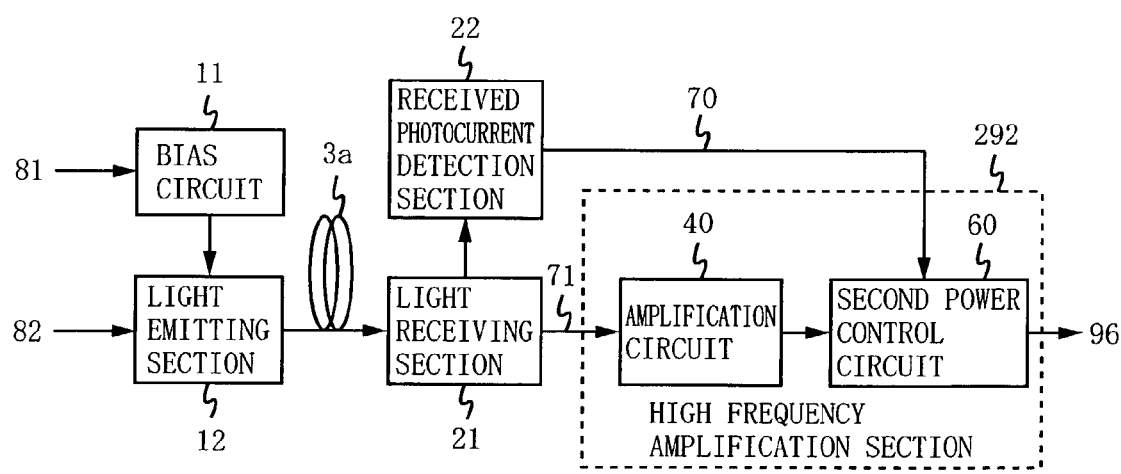
FIG. 26 is a block diagram showing the structure of an optical transmission device according to a sixth embodiment of the present invention.

FIG. 26 is a block diagram showing the structure of an optical transmission device according to a sixth embodiment of the present invention. A high frequency amplification section 292 included in the above-described optical transmission device includes the amplification circuit 40 and the second power control circuit 60, but does not include a first power control circuit. The amplification circuit 40 amplifies the radio transmission signal 71 by a predetermined amplification factor. The second power control circuit 60 performs automatic power control for the output signal of the amplification circuit 40, and outputs the power controlled signal as a radio transmission signal 96. The automatic power control in the second power control circuit 60 is performed for accommodating a change in power of the radio transmission signal 96, the change caused by other than a change in optical power. The second power control circuit 60 has the arbitrary structure described in the third and fourth embodiments.

According to the optical transmission devices of the fifth and sixth embodiments, as is the case with the third and fourth embodiments, it is possible to provide an optical transmission device including an automatic power control circuit (APC circuit) for a burst radio signal, the optical transmission device having a simple structure and capable of being realized at low cost.

Note that the optical transmission device according to the third to sixth embodiments may be structured as follows. First, a position of the amplification circuit 40 is not limited to a position immediately after the light receiving section 21, and may be an arbitrary position in a following stage of the light receiving section 21. Also, the variable attenuation circuit included in the first power control circuit 50 and the second power control circuit 60 may be a variable attenuation circuit capable of controlling an amplification factor. Furthermore, in an arbitrary position between the switch circuit 53 (or the sample-hold circuit 56) and the variable attenuation circuit 55, the first power control circuit 50 may include a filter circuit for removing switching noise caused in the switch circuit 53 (or the sample-hold circuit 56). The insertion of the above-described filter circuit allows noise in a control voltage to be supplied to the variable attenuation circuit 55 to be reduced, whereby it is possible to prevent the quality of transmission of a radio transmission signal from being degraded due to switching noise caused in the switch circuit 53 (or the sample-hold circuit 56). The second power control circuit 60 may include the same filter circuit as the first power control circuit 50. Also, any one of the first power control circuits 50a to 50d and any one of the second power control circuits 60a to 60d may be arbitrarily combined. Furthermore, a single comparison circuit may be used in place of the comparison circuit 51 included in the first power control circuit 50 and the comparison circuit 61 included in the second power control circuit 60. The above-described variants of the optical transmission device can produce the same effect as the optical transmission devices of the other embodiments.

While the invention has been described in detail, the foregoing description is in all aspects illustrative and not restrictive. It is understood that numerous other modifications and variations can be devised without departing from the scope of the invention.

What is claimed is:

1. An optical transmission device for transmitting an optical signal, the optical transmission device comprising:
   a variable light emitting section for obtaining a supply of a radio band transmission signal generated in a burst manner and a control signal indicating whether there is data to be transmitted, and outputting an optical signal modulated by the transmission signal;
   a light receiving section for receiving the optical signal output from the variable light emitting section and converting the received optical signal into an electric signal;
   a light intensity detection section for detecting an intensity of the optical signal received by the light receiving section; and
   a high frequency amplification section for amplifying the electric signal output from the light receiving section in accordance with the light intensity detected by the light intensity detection section,
   wherein the variable light emitting section includes:
      a bias supplying section for generating a bias current during a time period in which the control signal indicates that there is data to be transmitted; and
      a light emitting section for obtaining a supply of the bias current output from the bias supplying section, and emitting light whose intensity is greater than a predetermined threshold value and varies with respect to an intensity corresponding to the bias current in accordance with the transmission signal during a time period in which the control signal indicates that there is data to be transmitted,
   wherein the high frequency amplification section is operable to amplify the electric signal output from the light receiving section by a first amplification factor if the light intensity detected by the light intensity detection section exceeds the predetermined threshold value, and operable to amplify the electric signal by a second amplification factor smaller than the first amplification factor if the light intensity is equal to or smaller than the predetermined threshold value, and
   wherein the second amplification factor is substantially equal to zero.

2. The optical transmission device according to claim 1, wherein, during a time period in which the control signal does not indicate that there is data to be transmitted, the light emitting section outputs an optical signal whose intensity is substantially equal to zero.

3. The optical transmission device according to claim 1, further comprising a control signal reconstruction section for outputting a signal indicating whether or not the light intensity detected by the light intensity detection section exceeds a predetermined threshold value, as a reconstructed control signal.

4. The optical transmission device according to claim 1, wherein the high frequency amplification section amplifies the electric signal output from the light receiving section so as to obtain a signal having a substantially constant power, by controlling an amplification factor in accordance with the light intensity detected by the light intensity detection section.

5. The optical transmission device according to claim 4, wherein the high frequency amplification section includes at least either of:
- a first power control circuit for performing control so as to keep power of the amplified signal at a substantially constant level even if the intensity of the optical signal received by the light receiving section is changed; and
- a second power control circuit for performing control so as to bring power of the amplified signal closer to a pre-set value by performing feedback control.

6. The optical transmission device according to claim 5, wherein the first power control circuit includes:
- a variable power control circuit for controlling a power level of the electric signal output from the light receiving section, in accordance with a supplied control voltage;
- a voltage generation circuit for generating a predetermined voltage which is substantially equal to a voltage corresponding to a light intensity to be detected by the light intensity detection section at a time of generation of the transmission signal;
- a switch circuit for selecting a voltage corresponding to the light intensity detected by the light intensity detection section if the light intensity exceeds a predetermined threshold value, and selecting the voltage generated by the voltage generation circuit if the light intensity is equal to or smaller than the predetermined threshold value; and
- a first control voltage output circuit for obtaining the control voltage based on the voltage selected by the switch circuit, and outputting the obtained control voltage to the variable power control circuit.

7. The optical transmission device according to claim 5, wherein the first power control circuit includes:
- a variable power control circuit for controlling a power level of the electric signal output from the light receiving section, in accordance with a supplied control voltage;
- a first control voltage output circuit for obtaining, based on a voltage corresponding to the light intensity detected by the light intensity detection section, a voltage to be selectively supplied to the variable power control circuit;
- a voltage generation circuit for generating a predetermined voltage which is substantially equal to a voltage to be obtained by the first control voltage output circuit at a time of generation of the transmission signal; and
- a switch circuit for selecting the voltage obtained by the first control voltage output circuit if the light intensity detected by the light intensity detection section exceeds a predetermined threshold value, selecting the voltage generated by the voltage generation circuit if the light intensity is equal to or smaller than the predetermined threshold value, and outputting the selected voltage to the variable power control circuit as the control voltage.

8. The optical transmission device according to claim 5, wherein the first power control circuit includes:
- a variable power control circuit for controlling a power level of the electric signal output from the light receiving section, in accordance with a supplied control voltage;
- a sample-hold circuit for outputting a voltage corresponding to the light intensity detected by the light intensity detection section if the light intensity exceeds a predetermined threshold value, and outputting a voltage held after sampling the voltage corresponding to the light intensity while the light intensity exceeds the predetermined threshold value if the light intensity is equal to or smaller than the predetermined threshold value; and
- a first control voltage output circuit for obtaining the control voltage based on the voltage output from the sample-hold circuit, and outputting the obtained control voltage to the variable power control circuit.

9. The optical transmission device according to claim 5, wherein the first power control circuit includes:
- a variable power control circuit for controlling a power level of the electric signal output from the light receiving section, in accordance with a supplied control voltage;
- a first control voltage output circuit for obtaining, based on a voltage corresponding to the light intensity detected by the light intensity detection section, a voltage to be selectively supplied to the variable power control circuit; and
- a sample-hold circuit for outputting the voltage obtained by the first control voltage output circuit if the light intensity detected by the light intensity detection section exceeds a predetermined threshold value, and outputting a voltage held after sampling the voltage obtained by the first control voltage output circuit while the light intensity exceeds the predetermined threshold value if the light intensity is equal to or smaller than the predetermined threshold value, to the variable power control circuit as the control voltage.

10. The optical transmission device according to claim 6, wherein the first control voltage output circuit includes a logarithmic amplifier for outputting a logarithmic value of an input signal.

11. The optical transmission device according to claim 5, wherein the second power control circuit includes:
- a variable power control circuit for controlling a power level of an electric signal output from a previous stage circuit, in accordance with a supplied control voltage;
- an envelope detection circuit for performing envelope detection for a signal output from the variable power control circuit, and obtaining a power level of the signal;
- a voltage generation circuit for generating a predetermined voltage which is substantially equal to a voltage corresponding to a power level to be obtained by the envelope detection circuit at a time of generation of the transmission signal;
- a switch circuit for selecting a voltage corresponding to the power level obtained by the envelope detection circuit if the light intensity detected by the light intensity detection section exceeds a predetermined threshold value, and selecting the voltage generated by the voltage generation circuit if the light intensity is equal to or smaller than the predetermined threshold value; and
- a second control voltage output circuit for obtaining the control voltage based on the voltage selected by the switch circuit, and outputting the obtained control voltage to the variable power control circuit.

12. The optical transmission device according to claim 5, wherein the second power control circuit includes:
- a variable power control circuit for controlling a power level of an electric signal output from a previous stage circuit, in accordance with a supplied control voltage;
- an envelope detection circuit for performing envelope detection for a signal output from the variable power control circuit, and obtaining a power level of the signal;

a second control voltage output circuit for obtaining, based on a voltage corresponding to the power level obtained by the envelope detection circuit, a voltage to be selectively supplied to the variable power control circuit;

a voltage generation circuit for generating a predetermined voltage which is substantially equal to a voltage to be obtained by the second control voltage output circuit at a time of generation of the transmission signal; and a switch circuit for selecting the voltage obtained by the second control voltage output circuit if the light intensity detected by the light intensity detection section exceeds a predetermined threshold value, selecting the voltage generated by the voltage generation circuit if the light intensity is equal to or smaller than the predetermined threshold value, and outputting the selected voltage to the variable power control circuit as the control voltage.

13. The optical transmission device according to claim 5, wherein the second power control circuit includes:

a variable power control circuit for controlling a power level of an electric signal output from a previous stage circuit, in accordance with a supplied control voltage;

an envelope detection circuit for performing envelope detection for a signal output from the variable power control circuit, and obtaining a power level of the signal;

a sample-hold circuit for outputting a voltage corresponding to the power level obtained by the envelope detection circuit if the light intensity detected by the light intensity detection section exceeds a predetermined threshold value, and outputting a voltage held after sampling the voltage corresponding to the power level obtained by the envelope detection circuit while the light intensity exceeds the predetermined threshold value if the light intensity is equal to or smaller than the predetermined threshold value; and a second control voltage output circuit for obtaining the control voltage based on the voltage output from the sample-hold circuit, and outputting the obtained control voltage to the variable power control circuit.

14. The optical transmission device according to claim 5, wherein the second power control circuit includes:

a variable power control circuit for controlling a power level of an electric signal output from a previous stage circuit, in accordance with a supplied control voltage;

an envelope detection circuit for performing envelope detection for a signal output from the variable power control circuit, and obtaining a power level of the signal;

a second control voltage output circuit for obtaining, based on a voltage corresponding to the power level obtained by the envelope detection circuit, a voltage to be selectively supplied to the variable power control circuit; and a sample-hold circuit for outputting the voltage obtained by the second control voltage output circuit if the light intensity detected by the light intensity detection section exceeds a predetermined threshold value, and outputting a voltage held after sampling the voltage obtained by the second control voltage output circuit while the light intensity exceeds the predetermined threshold value if the light intensity is equal to or smaller than the predetermined threshold value, to the variable power control circuit as the control voltage.

15. The optical transmission device according to claim 11, wherein the second control voltage output circuit includes an averaging circuit for outputting an average value of an input signal.

16. The optical transmission device according to claim 11, wherein the second control voltage output circuit includes a peak-hold circuit for holding a peak value of an input signal.

17. The optical transmission device according to claim 16, wherein the second control voltage output circuit further includes:

an averaging circuit for outputting an average value of an input signal; and a select circuit for causing either the peak-hold circuit or the averaging circuit to function effectively, in accordance with a supplied select signal.

18. An optical transmission method for transmitting an optical signal, the optical transmission method comprising:

obtaining a supply of a radio band transmission signal generated in a burst manner and a control signal indicating whether there is data to be transmitted;

outputting an optical signal having an intensity corresponding to the control signal and modulated by the transmission signal;

receiving the optical signal;

converting the received optical signal into an electric signal;

detecting an intensity of the received optical signal; and amplifying the electric signal in accordance with the detected light intensity, wherein said outputting the optical signal includes:

generating a bias current during a time period in which the control signal indicates that there is data to be transmitted, obtaining a supply of the bias current generated in said generating, and emitting light whose intensity is greater than a predetermined threshold value and varies with respect to an intensity corresponding to the bias current in accordance with the transmission signal during a time period in which the control signal indicates that there is data to be transmitted, wherein in said amplifying, the electric signal converted in said converting is amplified by a first amplification factor if the light intensity detected in said detecting exceeds the predetermined threshold value, and is amplified by a second amplification factor smaller than the first amplification factor if the light intensity is equal to or smaller than the predetermined threshold value, and wherein the second amplification factor is substantially equal to zero.

19. The optical transmission method according to claim 18, wherein in said amplifying, the electric signal is amplified so as to obtain a signal having a substantially constant power, by controlling an amplification factor in accordance with the detected light intensity.

20. A radio communication system for transmitting and receiving a radio signal, the radio communication system comprising:

a variable light emitting section for obtaining a supply of a radio band transmission signal generated in a burst manner and a control signal indicating whether there is data to be transmitted, and outputting an optical signal having an intensity corresponding to the control signal and modulated by the transmission signal;

a light receiving section for receiving the optical signal output from the variable light emitting section and converting the received optical signal into an electric signal;

a light intensity detection section for detecting an intensity of the optical signal received by the light receiving section;

a high frequency amplification section for amplifying the electric signal output from the light receiving section in accordance with the light intensity detected by the light intensity detection section;

an electric wave transmitting and receiving section having a function of transmitting an electric wave based on the electric signal amplified by the high frequency amplification section, and a function of receiving an electric wave and outputting a radio band reception signal;

a transmitting section for transmitting the reception signal; and a receiving section for receiving the reception signal transmitted from the transmitting section, wherein the variable light emitting section includes:

a bias supplying section for generating a bias current during a time period in which the control signal indicates that there is data to be transmitted; and a light emitting section for obtaining a supply of the bias current output from the bias supplying section, and emitting light whose intensity is greater than a predetermined threshold value and varies with respect to an intensity corresponding to the bias current in accordance with the transmission signal during a time period in which the control signal indicates that there is data to be transmitted, wherein the high frequency amplification section amplifies the electric signal output from the light receiving section by a first amplification factor if the light intensity detected by the light intensity detection section exceeds the predetermined threshold value, and amplifies the electric signal by a second amplification factor smaller than the first amplification factor if the light intensity is equal to or smaller than the predetermined threshold value, and wherein the second amplification factor is substantially equal to zero.

21. The radio communication system according to claim 20, wherein the electric wave transmitting and receiving section transmits the electric wave if the light intensity detected by the light intensity detection section exceeds a predetermined threshold value, and receives the electric wave if the light intensity is equal to or smaller than the predetermined threshold value.

22. The radio communication system according to claim 20, wherein the transmitting section includes an uplink light emitting section for outputting an optical signal modulated by the reception signal, and the receiving section includes an uplink light receiving section for receiving the optical signal output from the uplink light emitting section, and outputting the reception signal as an electric signal.

23. The radio communication system according to claim 20, wherein the transmitting section includes a radio demodulation section for demodulating the reception signal and an uplink light emitting section for outputting an optical signal modulated by a signal output from the radio demodulation section, and the receiving section includes an uplink light receiving section for receiving the optical signal output from the uplink light emitting section, and outputting the reception signal as an electric signal.

24. The optical transmission device according to claim 7, wherein the first control voltage output circuit includes a logarithmic amplifier for outputting a logarithmic value of an input signal.

25. The optical transmission device according to claim 8, wherein the first control voltage output circuit includes a logarithmic amplifier for outputting a logarithmic value of an input signal.

26. The optical transmission device according to claim 9, wherein the first control voltage output circuit includes a logarithmic amplifier for outputting a logarithmic value of an input signal.

27. The optical transmission device according to claim 12, wherein the second control voltage output circuit includes an averaging circuit for outputting an average value of an input signal.

28. The optical transmission device according to claim 13, wherein the second control voltage output circuit includes an averaging circuit for outputting an average value of an input signal.

29. The optical transmission device according to claim 14, wherein the second control voltage output circuit includes an averaging circuit for outputting an average value of an input signal.

30. The optical transmission device according to claim 12, wherein the second control voltage output circuit includes a peak-hold circuit for holding a peak value of an input signal.

31. The optical transmission device according to claim 13, wherein the second control voltage output circuit includes a peak-hold circuit for holding a peak value of an input signal.

32. The optical transmission device according to claim 14, wherein the second control voltage output circuit includes a peak-hold circuit for holding a peak value of an input signal.

33. The optical transmission device according to claim 1, wherein the control signal indicates that there is data to be transmitted during a time period in which the transmission signal is generated.

34. The optical transmission method according to claim 18, wherein the control signal indicates that there is data to be transmitted during a time period in which the transmission signal is generated.

35. The radio communication system according to claim 20, wherein the control signal indicates that there is data to be transmitted during a time period in which the transmission signal is generated.

* * * * *